(12) United States Patent
Vishnu

(10) Patent No.: US 6,954,811 B2
(45) Date of Patent: Oct. 11, 2005

(54) ARBITER FOR AN INPUT BUFFERED COMMUNICATION SWITCH

(75) Inventor: Meenaradchagan Vishnu, Petaluma, CA (US)

(73) Assignee: Calix Networks, Inc., Petaluma, CA (US)

( * ) Notice: Subject to any disclaimer, the term of this patent is extended or adjusted under 35 U.S.C. 154(b) by 171 days.

(21) Appl. No.: 10/199,996

(22) Filed: Jul. 19, 2002

(65) Prior Publication Data

US 2004/0017804 A1 Jan. 29, 2004

(51) Int. Cl.[7] .............................................. G06F 13/00

(52) U.S. Cl. ..................................... 710/113; 710/316

(58) Field of Search ................................ 710/107, 109, 710/111–116, 309–310, 316–317, 17–18, 36–41, 52–57; 370/229–232, 395.1

(56) References Cited

U.S. PATENT DOCUMENTS

| | | | |
|---|---|---|---|
| 5,119,367 A | * | 6/1992 | Kawakatsu et al. .......... 370/232 |
| 5,295,135 A | * | 3/1994 | Kammerl ..................... 370/233 |
| 5,455,826 A | | 10/1995 | Ozveren et al. |
| 5,471,632 A | * | 11/1995 | Gavin et al. ................. 710/104 |
| 5,500,858 A | | 3/1996 | McKeown |
| 5,577,035 A | | 11/1996 | Hayter et al. |
| 5,604,867 A | * | 2/1997 | Harwood ..................... 709/233 |
| 5,634,004 A | | 5/1997 | Kurshan et al. |
| 5,710,549 A | * | 1/1998 | Horst et al. ............... 340/825.5 |
| 5,741,632 A | * | 4/1998 | Kiekens ....................... 430/522 |
| 5,828,878 A | | 10/1998 | Bennett |
| 5,859,835 A | | 1/1999 | Varma et al. |
| 5,923,644 A | | 7/1999 | McKeown et al. |
| 5,982,771 A | | 11/1999 | Caldara et al. |

(Continued)

OTHER PUBLICATIONS

Office Action dated Sep. 28, 2004 in EP Application No. 03254534.5–2416 based on U.S. Appl. No. 10/199,996 (5 pages total excluding cover sheet).

Search Report dated Oct. 15, 2003 in EP Application No. 03254534.5–2416 based on U.S. Appl. No. 10/199,996 (2 pages total excluding cover sheet).

"The iSLIP scheduling algorithm for input–queued switches," by N. W. McKeown in IEEE/ACM Transactions on Networking, vol. 7, No. 2, Apr. 1999.

(Continued)

*Primary Examiner*—Khanh Dang
(74) *Attorney, Agent, or Firm*—Silicon Valley Patent Group LLP

(57) ABSTRACT

An arbiter for a switch maintains a pair of counters for each flow of traffic at each input port: one counter (also called "first counter") to indicate an ideal transfer of traffic, and another counter (also called "second counter") to indicate the actual transfer of traffic. Both counters are incremented when traffic is received by the input port, and the second counter is decremented when a unit of traffic (such as a cell or packet) is about to be transmitted whereas the first counter is decremented in a fractional manner (relative to the unit of traffic) in each period of arbitration, based on available bandwidth. The arbiter selects one of the output ports (also called "winning output port") of the switch, based at least partially on values of the two counters for each flow from the input port to one of the output ports, and generates a signal to approve transfer of traffic from the input port to the winning output port. In several embodiments, the above-described flow can be for either high priority traffic or for low priority traffic, and any bandwidth leftover from transferring high priority traffic is used in transferring low priority traffic. Specifically, the arbiter maintains additional counters for each port indicative of total bandwidth being used, and the additional counters are used to allocate leftover bandwidth in an iterative manner, until a flow from an input port to an output port is saturated, at which time the saturated flow is removed from iteration.

18 Claims, 19 Drawing Sheets

U.S. PATENT DOCUMENTS

| | | | |
|---|---|---|---|
| 6,014,367 A | 1/2000 | Joffe | |
| 6,072,800 A | 6/2000 | Lee | |
| 6,134,217 A | 10/2000 | Stiliadis et al. | |
| 6,160,812 A | 12/2000 | Bauman et al. | |
| 6,185,221 B1 | 2/2001 | Aybay | |
| 6,262,986 B1 | 7/2001 | Oba et al. | |
| 6,327,253 B1 | 12/2001 | Frink | |
| 6,385,678 B2 * | 5/2002 | Jacobs et al. | 710/113 |
| 6,389,031 B1 | 5/2002 | Chao | |
| 6,389,480 B1 * | 5/2002 | Kotzur et al. | 709/249 |
| 6,501,731 B1 * | 12/2002 | Chong et al. | 370/230.1 |

OTHER PUBLICATIONS

T. Anderson, S. Owicki, J. Saxe and C. Thacker, "High Speed Switch for Local Area Networks", ACM Transactions on Computer Systems, vol. 11, No. 4, Nov. 1993 pp. 1–13.

N. W. McKeown, M. Izzard, A. Mekkittikul, W. Ellersick and M. Horowitz, "The tiny tera: A packet switch core", Hot Interconnects V., Aug. 1996, pp. 1–13.

A. Parekh, R. Gallager, "A Generalized Processor Sharing Approach To Flow Control in Integrated Services Networks: The Multiple Node Case", IEEE/ACM Transaction On Networking, vol. 2, No. 2, Apr. 1994, pp. 136–151.

A. Parekh, R. Gallager, "A Generalized Processor Sharing Approach To Flow Control in Integrated Services Networks: The Single Node Case", IEEE/ACM Transaction On Networking, vol. 1, No. 2, Jun. 1993, pp. 344–357.

D. Stiliadis, A. Varma, "Efficient Fair–Queuing Algorithms for Packet–Switched Networks", IEE/ACM Transaction On Networking, vol. 6, No. 2, 1998, Article No. 27473, pp. 1–11 and B.1–B.2.

M. Goureau, S. Kolliopoulos, S. Rao, "Scheduling Algorithms for Input–Queued Switches: Randomized Techniques and Experimental Evaluation", IEEE/Infocom 2000, pp. 1634–1643.

J. Bennett, Hui Zhang "Why WFQ Is Not Good Enough For Integrated Services Networks", 1996, pp. 1–8.

N. McKeown, A. Mekkittikul, V. Anantharam, J. Walrand, "Achieving 100% Throughput in an Input–Queued Switch", IEEE Transaction Communications, vol. 47, No. 8, Aug. 1999, (22 pages).

I. Stoica, S. Shenker, H. Zhang, "Core–Stateless Fair Queuing: Achieving, Approximately Fair Bandwidth Allocations in High Speed Networks", Http://www–2.cs.cmu.edu/~istoica/sig98talk/, 1998, pp1–20.

N. KcKeown, "Scheduling Algorithms for Input–Queued Cell Switches", ©1995, pp. 1–119.

R. Schoenen, "An Architecture Supporting Quality–of–Service in Virtual–Output–Queued Switches", iEICE Transaction Communications, vol. E83–B, No. 2, Feb. 2000, pp. 1–10.

M.J.G. van Uitert, S.C. Borst, "A Reduced–Load Equivalence For Generalized Processor Sharing Networks With Heavy–Tailed Input Flows", Probability, Networks and Algorithms (PNA), PNA–R007, Aug. 31, 2000, pp. 1–37.

N. Joy, K. Jamadagni, "Optimal Call Admission Control in Generalized Processor Sharing (GPS) Schedulers", IEEE Infocom 2001, pp. 1–10.

D. Stiliadis, A. Varma, "Rate–Proportional Servers: A Design Methodology for Fair Queuing Algorithms", UCSC–CRL–95–58, Dec. 1995, pp. 1–22 and A.1–A.4.

D. Staliadis, A. Varma, "Latency–Rate Servers: A General Model for Analysis of Traffic Scheduling Algoriths", IEEE/ACM Transactions of Networking, vol. 6, No. 5, Oct. 1998, pp. 611–624.

M. Vishne, "Implementing VirtualClock without Cell Stamps", IEEE Communications Letters, 1997, pp. 1–3.

M. Vishne, J. Mark, "A Flexible Service Scheduling Scheme for ATM Networks", DBLP Record conf/infocom/VishnuM96, 1996, pp. 647–654.

M. Vishne, J. Mark, "Reference Queue Tracking Strategies for Delay Guarantees in ATM Networks", Nov. 4, 1997, pp. 1–22.

M. Vishne, J. Mark, "Reference Queue Tracking Strategies for Delay Guarantees in ATM Networks", Nov. 22, 1999, pp. 1–18.

M. Vishne, J. Mark, "HOL–EDD: A Novel Service Scheduling Scheme for ATM Networks", Jun. 16, 1997, pp. 1–23.

* cited by examiner

ARBITER FOR AN INPUT BUFFERED COMMUNICATION SWITCH

CROSS-REFERENCE TO SOFTWARE APPENDIX

Appendix A contains the following files in one CD-ROM (of which two identical copies are attached hereto), and is a part of the present disclosure and is incorporated by reference herein in its entirety.

```
Volume in drive D has no label.
Volume Serial Number is 0C15-8740
Directory of D:\
07/19/2002  06:58p        38,099 arbiter.cc
07/19/2002  06:59p        11,609 arbiter.hh
       2 File(s)          49,708 bytes
Total Files Listed:
       2 File(s)          49,708 bytes
       0 Dir(s)                0 bytes free
```

The files of Appendix A form source code of computer programs for an illustrative embodiment of the present invention. The file ARBITER.CC contains computer instructions in the language C++ for describing the behavior of one embodiment of an arbiter that supports flows of two priorities through a cross-connect. File ARBITER.HH provides definitions of various constants and data structures used by the computer instructions in the file ARBITER.CC.

COPYRIGHT NOTICE

A portion of the disclosure of this patent document contains material that is subject to copyright protection. The copyright owner has no objection to the facsimile reproduction by anyone of the patent document or the patent disclosure, as it appears in the in the Patent and Trademark Office patent files or records, but otherwise reserves all copyright rights whatsoever.

BACKGROUND

Consider the problem of building a communication switch with N input ports and N output ports. If we place the buffers at the output ports, then we need to use memory with bandwidth equal to the sum of the bandwidths of the input ports. This can be done by using fast static memory with very wide memory buses. Using the current memory technology, this solution is only cost effective when the aggregate bandwidth of the switch is less than 50 Gbits/sec. Therefore, virtual output queued (VOQ) architecture is an attractive option for building switches with higher aggregate bandwidth. However, since the hardware complexity of the arbiter is $O(N^2)$, the VOQ switches are only practical for switches with a moderate number of switch ports (e.g. $N \leq 32$). Note that the number of switch ports is equal to the number of line cards. The actual number of switch ports can be larger as multiple ports can be multiplexed/demultiplexed by the line cards. In a switch with the VOQ architecture, the memory write bandwidth is equal to the input port bandwidth and the read bandwidth is equal to the switch bandwidth. The bandwidth of a cross-connect (FIG. 1A) is higher than the maximum port bandwidth by a speedup factor. The arbiter has to operate at or above the maximum port bandwidth. The output buffers need to have a read bandwidth equal to the output port bandwidth and write bandwidth equal to the bandwidth of the switching fabric.

Extensive work on the problem of enhancing the throughput of input buffered switches has been described by N. W. McKeown in an article entitled "The iSLIP scheduling algorithm for input-queued switches," IEEE/ACM Transactions on Networking, vol. 7, no. 2, April 1999 and by N. W. McKeown, M. Izzard, A. Mekkittikul, W. Ellersick, and M. Horowitz in another article entitled "The tiny tera: A packet switch core," in Hot Interconnects V, August 1996. Both these articles are incorporated by reference herein in their entirety. The arbitration problem is equivalent to a bipartite matching problem for which the best known algorithm has a time complexity of the order of $n^{n/2}$ as described by J. E. Hopcroft and R. M. Karp, in an article entitled "An $n^{5/2}$ algorithm for maximum matchings for bipartitle graphs," SIAM Journal on Computing, vol. 2, no. 4, pp. 225–231, 1973. This article is also incorporated by reference herein in its entirety.

A hardware arbiter has to make arbitration decisions within one cell interval of the switching fabric. This can only be achieved by using parallelism and careful methods to minimize probability of "synchronization" of decisions by independent modules working in parallel. One way of building an arbiter is by using two sets of N independent schedulers as shown in FIG. 1B. The jth scheduler in the first set corresponds to the jth output port and the ith scheduler in the second set corresponds to the ith input port. The jth output port scheduler selects an input port from the set of input ports that have indicated cell arrival to the jth output port. And the ith input port scheduler selects an output port from the set of output ports which had selected the ith input port in the first step. Any unmatched input and output ports are matched in the subsequent iteration(s). A prior art method called Parallel Iterative Matching (PIM) arbitration algorithm uses random schedulers: A requesting port is selected with uniform probability. This algorithm is further described by T. Anderson, S. Owicki, J. Saxe, and C. Thacker in an article entitled "High speed switch scheduling for local area networks," ACM Transactions on Computer Systems, vol. 11, no. 4, pp. 319–352, November 1993 that is incorporated by reference herein in its entirety.

Another method, namely the iSLIP arbitration algorithm described in the article entitled "The iSLIP scheduling algorithm for input-queued switches," uses round-robin schedulers. In the case of iSLIP, the schedulers are not truly independent: The round-robin scheduler in the input unit is only advanced if its selection is accepted by the round-robin scheduler at the output unit. Various weighted versions of the round-robin schedulers are used in commercial switches. However, it must be noted that a simple weighted round-robin scheme is not suitable as it increases the probability of "synchronization." "Synchronization" occurs when more than one scheduler selects the same port repeatedly thus reducing the switch throughput. McKeown suggested the use of circular schedule lists to implement weighted iSLIP arbiters. However, very large schedule lists are needed and programming these lists as connections are added and deleted is not a trivial problem. Moreover, the two sets of schedulers use two sets of weights and there does not seem to be a simple relationship between the weights and the bandwidth allocated to the flows. The main drawback, however, of the arbiters using two sets of schedulers is that these arbiters do not provide fairness of the type described by D. Cavendish, M. Goudreau, and A. Ishii, in an article entitled "On the fairness of scheduling algorithms for input-queued switches," in International Teletraffic Congress, December 2001, vol. 4, pp. 829–841 which is incorporated by reference herein in its entirety.

SUMMARY

In accordance with the invention, an arbiter for a communication switch maintains a pair of counters for each flow of traffic at each input port: one counter (also called "first counter") to indicate an ideal transfer of traffic, and another counter (also called "second counter") to indicate the actual transfer of traffic. Both counters are incremented when traffic is received by the input port, but the two counters are decremented in two different ways as described next.

The second counter is decremented when a unit of traffic (such as a cell or packet) is approved for transfer by the input port to a destination output port. The amount of decrement is proportional to the size of the unit of traffic that is transferred. Therefore, the value in the second counter of each input port indicates the amount of traffic that has arrived at the input port and that has not completed transfer through the communication switch, regardless of traffic conditions at other ports. The first counter is decremented in a fractional manner (relative to the unit of traffic), if a fraction of traffic can be transmitted in a current period. The value in the first counter depends on the bandwidth available at the port and on traffic conditions at other ports.

In certain embodiments, the arbiter selects one of the output ports (hereinafter "winning output port"), based at least partially on values of the two counters for each flow from the input port to one of the output ports, and generates a signal (hereinafter "grant signal") to approve transfer of traffic from the input port to the winning output port.

In several embodiments, the above-described flow is one of a number of flows for traffic of different priorities to be transferred between the input port and the output port, and each flow is associated with at least the first and second counters. Decrementing of the first counter for each high priority flow is performed automatically periodically unless the first counter is zero. If the first counter of a high priority flow is smaller than a bandwidth requirement (also called "weight") of the high priority flow, then the decrement amount is equal to the first counter, else the decrement amount is equal to the bandwidth requirement.

In several embodiments, any bandwidth leftover from transferring high priority traffic may be used in transferring traffic in one or more low priority flows, based on an additional counter that is associated with each input port and each output port. Specifically, certain embodiments of the arbiter maintain a counter (hereinafter "used input port bandwidth") for each input port indicative of total decrements in the first counter of each flow between the input port and all output ports, and also maintain a counter (hereinafter "used output port bandwidth") for each output port indicative of a sum of decrements in the first counter of each flow between the output port and all input ports. The difference between the used input port bandwidth and a predetermined input port bandwidth represents the leftover bandwidth available at each input port for transfer of low priority traffic. Similarly, the difference between the used output port bandwidth and the maximum output port bandwidth represents the leftover bandwidth available at each output port for transfer of low priority traffic.

In some embodiments, the just-described leftover bandwidths are allocated in an iterative manner from the input units of the arbiter to the output units of the arbiter, until a flow from an input unit to an output unit is saturated, at which time the saturated flow is removed from the iteration. A flow is saturated if the bandwidth allocation for the flow cannot be increased because of port bandwidth constraint or because the bandwidth allocated for the flow has reached the bandwidth of a source of the flow. The port bandwidth constraint is reached when the sum of bandwidth of all flows through a port exceeds the maximum bandwidth supported by the port. The iteration may be performed a fixed number of times (e.g. 2 times), or alternatively may be performed until all flows are saturated.

DETAILED DESCRIPTION

In certain embodiments of the invention, a network element is architected to use a virtual output queued (VOQ) switch and an arbiter 120 (FIG. 2A) that maintains a pair of counters for each flow (buffered in a virtual output queue) at each input port. For example, a pair of counters 121AA and 122AA (together referred to as counters 123AA) are maintained for a first flow "A" (not shown or labeled in FIG. 2A) through a first input port 102A. In a similar manner counters 123AI are maintained for the $i^{th}$ flow through first input port 102A, and counters 123AN are maintained for the $N^{th}$ flow through first input port 102A. Furthermore, counters 123IA are maintained for the first flow in the $i^{th}$ input port 102I, and so on.

Of the two counters 123IJ that are maintained for each traffic flow, one counter (also called "first counter") indicates an ideal transfer of traffic regardless of the discrete size of each unit of traffic, and another counter (also called "second counter") tracks the actual transfer of traffic. For this reason, in some embodiments the first counter has more resolution than the second counter, e.g. the first counter may be a 32 bit counter whereas the second counter may be an 8 bit counter or alternatively the first counter may be a floating point counter and the second counter may be an integer counter. Each pair of counters 123IJ are incremented (as illustrated by act 141 in FIG. 2B) on arrival of traffic at the respective input port 102I, and destined for the respective output port 103J.

Arrival of traffic into one of the virtual output queues (voqs) in an input port 102I may be indicated to arbiter 120 via a signal (called "traffic arrival") that is generated by the respective input port of the network element. Note that the traffic can be in the form of variable length packets, fixed length cells or a combination, although in certain embodiments, the traffic is in the form of fixed length cells and in such embodiments the traffic arrival signal is referred to as cell arrival.

Figure 2A:
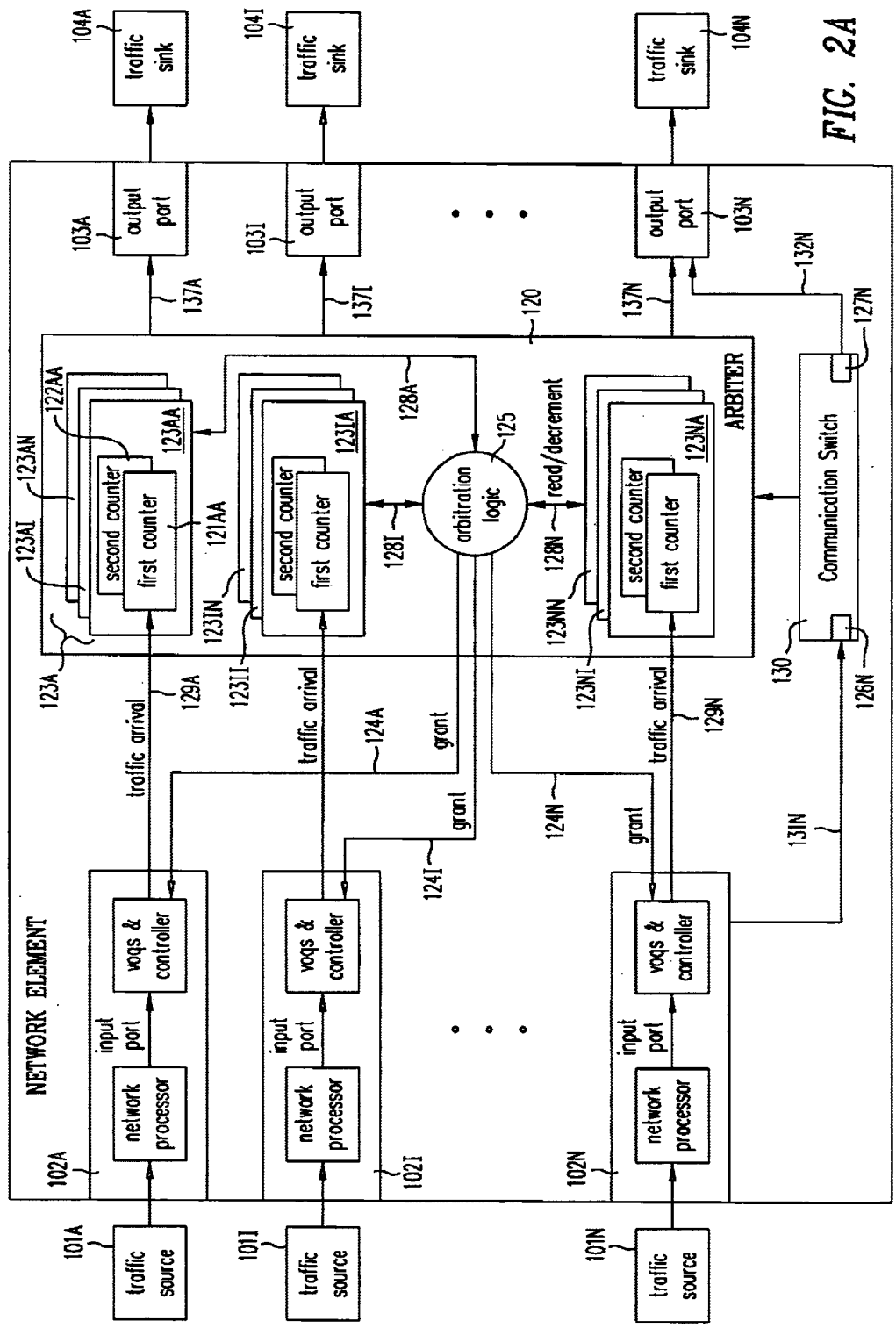
FIG. 2A illustrates, in a block diagram, an arbiter in accordance with the invention, that maintains a pair of counters for each input port.

In the embodiment illustrated in FIG. 2A, the traffic arrival signal automatically causes the respective pair of counters to increment, although in an alternative embodiment, such a signal is received by a logic 125 (hereinafter "arbitration logic") that then increments the counters (as per act 141). Therefore, it is to be understood that embodiments may differ in use of specific hardware that performs any of acts 141–145 of method 140. Moreover such acts may be performed in any order (including simultaneously) although a specific order has been illustrated as being used in some embodiments.

To indicate an ideal transfer of traffic, during each period arbitration logic 125 automatically decrements (as per act 142 in FIG. 2B) the first counter for each flow, if the first counter is nonzero. Next, arbitration logic 125 selects (as per act 143 in FIG. 2B) zero or one flow at each input port (also called "winning flow") based at least partially on values of counters in the pair for each flow from the input port to one of the output ports. As illustrated in FIG. 2A, the counters may be read by arbitration logic 125 via buses 128A–128N that are connected to the respective counters 123A–123N.

The specific criteria used in selecting a winning flow (and hence an output port which is also called "winning output port") depend on the embodiment. In some embodiments, the selection is based on the relative values of the two counters of each flow associated with the input port. In one specific embodiment, arbitration logic 125 selects (in one example of act 143 in FIG. 2B) the flow that has the greatest difference between counters among all flows associated with the input port whose first counter is less than or equal to the second counter. Regardless of how the selection is done, if a winning flow is selected, arbitration logic 125 generates a signal (also called "grant signal") on a bus 124I to input port 102I (see FIG. 2A) to approve transfer of traffic from the input port, to the winning output port of the input port, as illustrated by act 144 in FIG. 2B.

In response to the grant signal, each input port transfers the traffic of the winning flow (from a virtual output queue) to the communication switch 130 that may be implemented as a cross-connect in certain embodiments although other structures (such as a multi-stage switch e.g. a butterfly switch, a batcher-banyan switch or a clos switch) may be used in other embodiments. For example, traffic may be transferred by input port 102N via a bus 131N to switch 130 that in turn is programmed to transfer the traffic to the destination output port, e.g. port 103N, via bus 132N. For clarity, not all such buses are shown in FIG. 2A, although it is to be understood that each port in network element 100 is connected to switch 130.

Furthermore, in certain embodiments, arbiter 120 is coupled to switch 130 to receive therefrom a signal indicating congestion therein, for use in slowing down or stopping the issuance of grant signals to one or more ports responsible for the congestion. In several such embodiments, switch 130 is enhanced with a number of first-in-first-out (FIFO) queues at the inputs and outputs of switch 130, and each output of switch 130 has an independent scheduler which selects input ports for receipt of traffic therefrom in a round robin fashion.

Figure 2B:
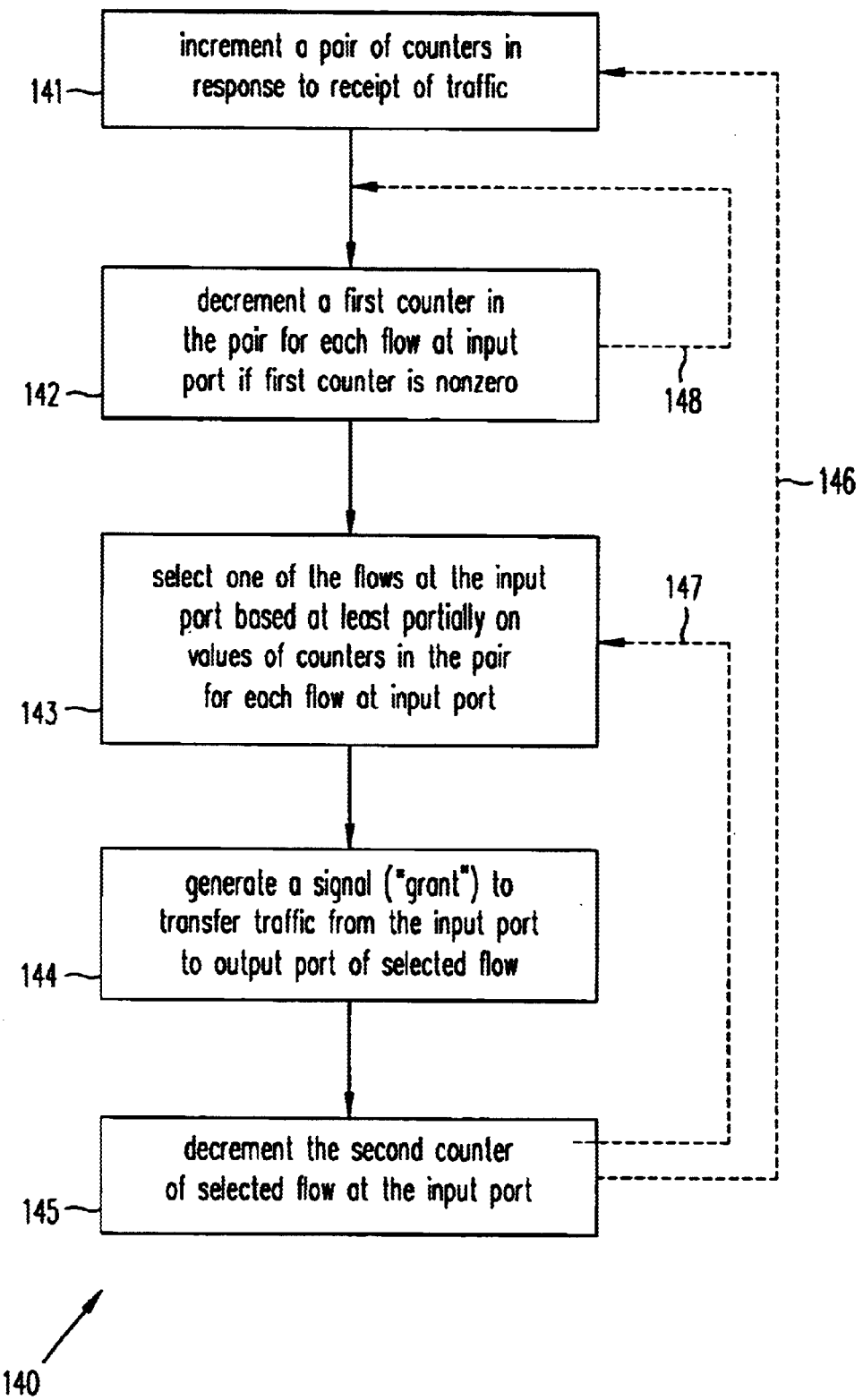
FIGS. 2B and 2C illustrate, in a flow chart, methods performed in two embodiments for maintaining the counters of FIG. 2A, and generation of a grant signal to approve transfer of traffic from each input port to a winning output port.

At some point thereafter, the second counter of the winning flow is decremented by the arbitration logic 125 (e.g. via bus 128I) to keep track of the actual transfer of traffic (as per act 145 in FIG. 2B). Depending on the situation, one or more of the above-described acts 141–145 may be repeated in the next period (each period is defined by the time required to transfer the traffic in response to the grant signal, and the period may be fixed by the speed of the backplane (e.g. speed of buses 131N and 132N). For example, if in the next period additional traffic is received, then act 141 is repeated, followed by performance of acts 142–145 (e.g. if only one flow is active in the entire network element).

Moreover, even in the current period, acts 143–145 may be repeated for each input port (as per branch 147), or alternatively may be performed simultaneously. Furthermore, act 142 may be repeated as illustrated by branch 148, for example if no additional traffic is received in the next period, and if none of the flows at the input port are enabled for selection (enablement of a flow is required prior to selection in some embodiments, as discussed next).

Figure 2C:
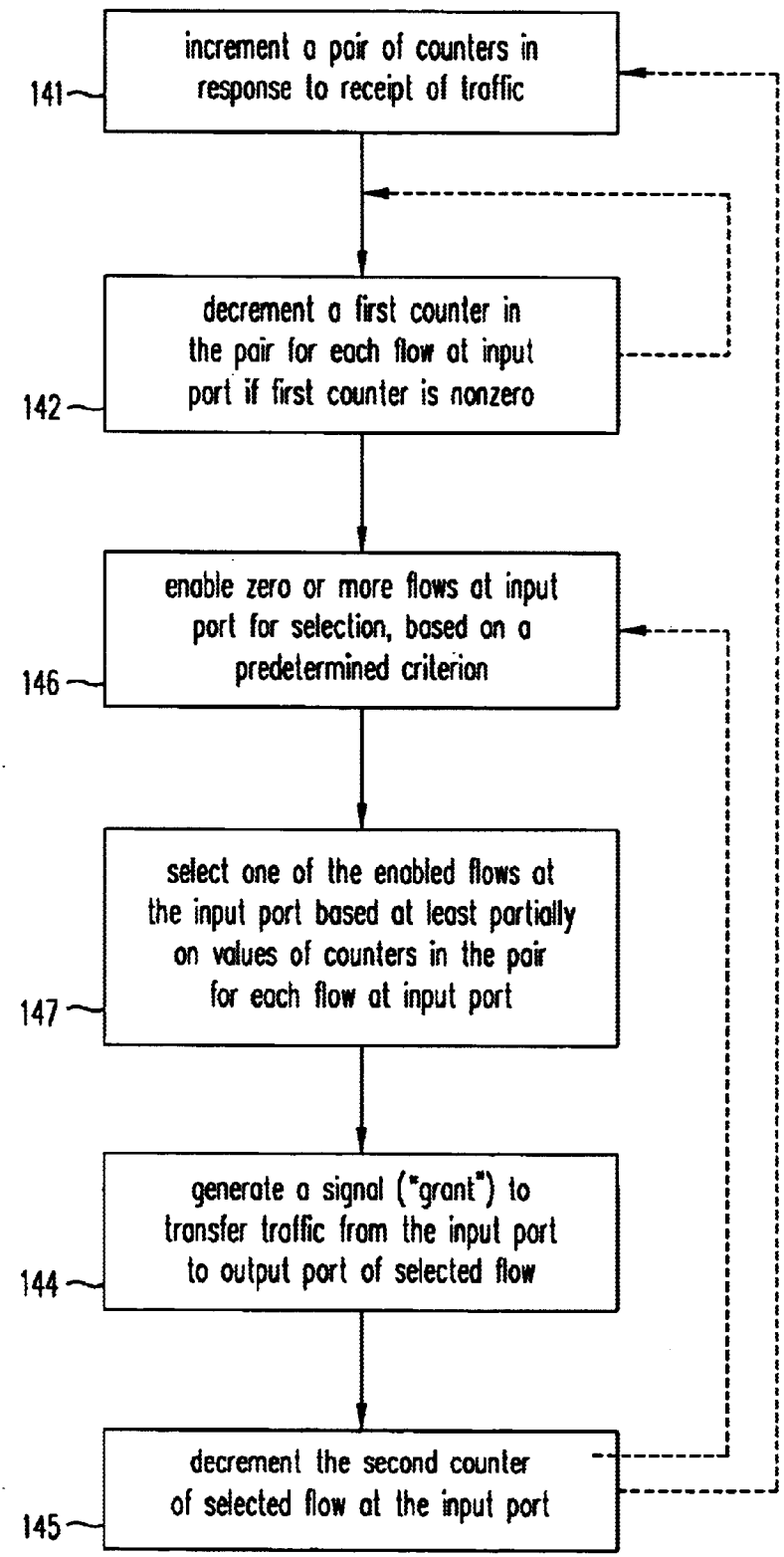

Specifically, in some embodiments, prior to selection as per act 147 (FIG. 2C), arbitration logic 125 performs an act 146 (FIG. 2C) to enable zero or more flows at the input port based on a predetermined criterion. Depending on the embodiment, the predetermined criterion may be designed to reduce the probability of synchronization in selection of the same output port by more than one input port. In some embodiments, a predetermined criterion is designed to enable a flow at an input port 102I based on the value I, e.g. if the second counter is greater than the first counter by at least $(R/N)*I$ where I is the flow identity, R is the resolution and N is the number of flows. Such use of the identity I results in staggered enabling of the flows of each input port, relative to the beginning of the period.

Figure 3A:
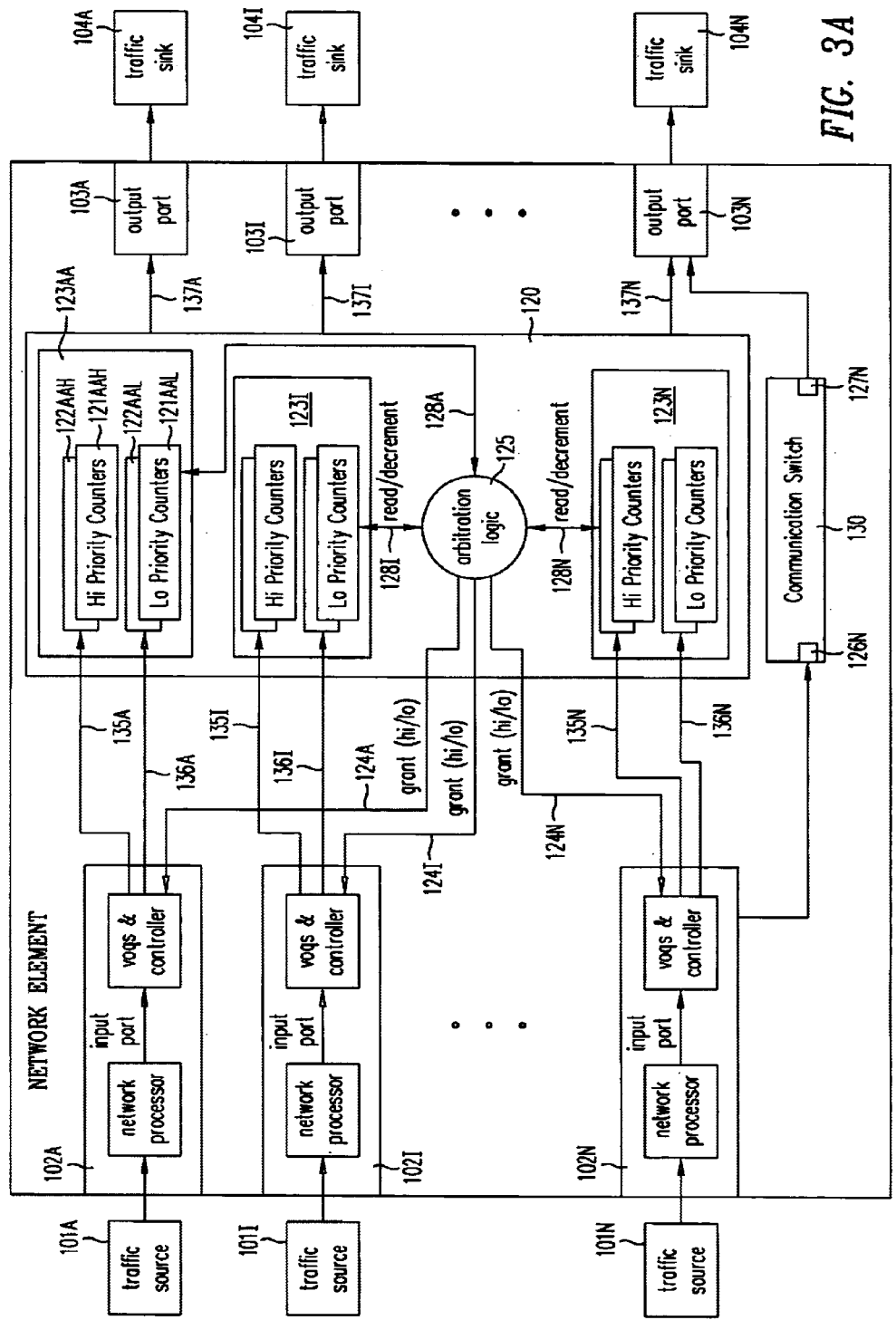
FIGS. 3A and 3B illustrate alternative embodiments of the arbiter and method illustrated in FIGS. 2A and 2B respectively.

In several embodiments, the above-described flow of traffic is one of a number of flows, for traffic of different priorities to be transferred between the input port and the output port, and each flow (regardless of priority) is associated with at least the first and second counters as illustrated in FIG. 3A. For example, counters 123A include two pairs of counters, namely counters 121AAH and 122AAH which form a pair for a high priority flow in the first input port 102A, and counters 121AAL and 122AAL which form another pair for a low priority flow in the first input port 102A. Although only one set of counters 123AA are illustrated in FIG. 3A for a pair of high and low priority flows, it is to be understood that for each input port there are as many flows (and hence as many sets of counters) as the number of output ports, thereby to implement virtual output queued (VOQ) architecture.

Figure 3B:
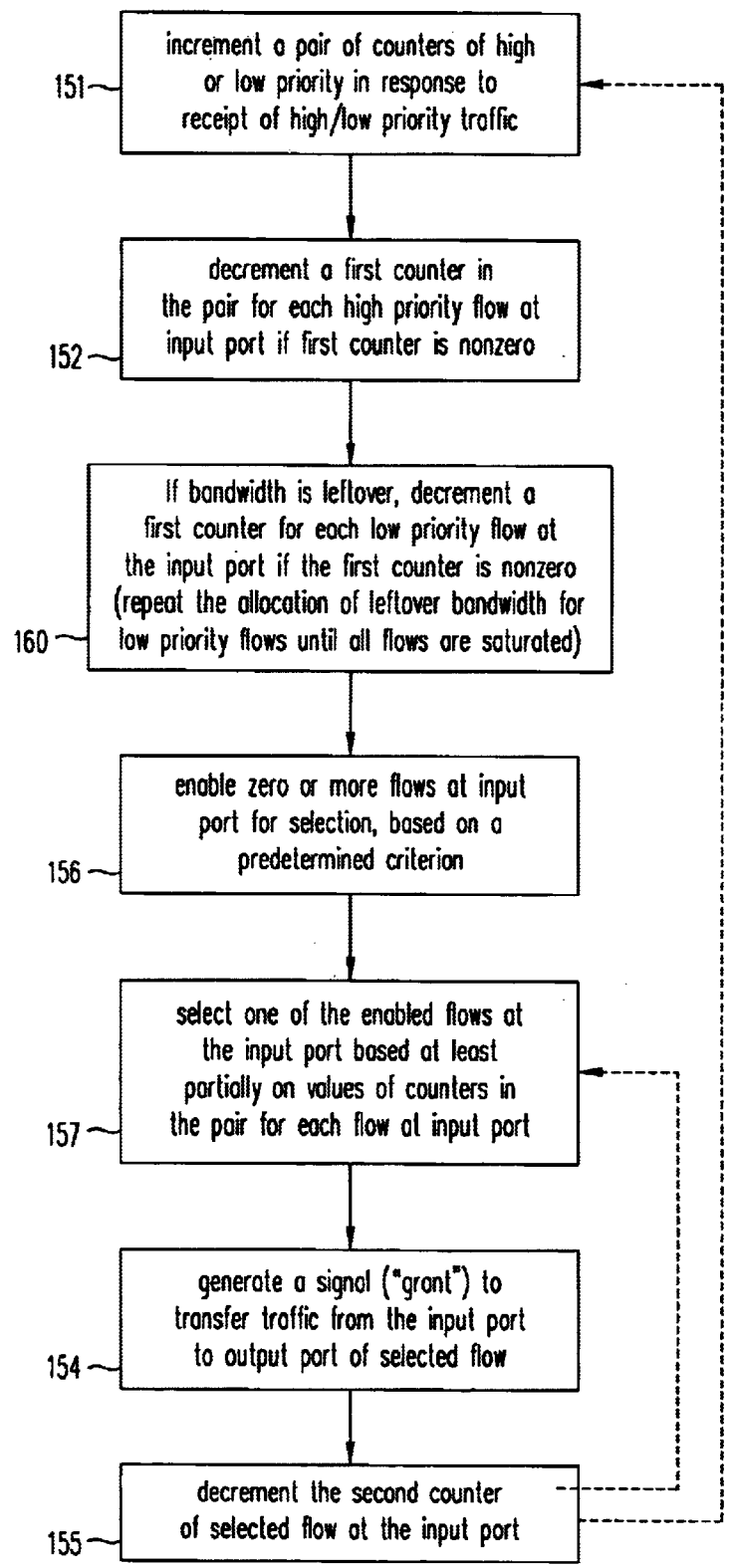

Such embodiments perform a method 150 (FIG. 3B) including acts 151, 152 and 154–156 that are similar or identical to the corresponding acts 141, 142 and 144–147 described above in reference to FIGS. 2B and 2C, except that the flows are specifically for carrying high priority or low priority traffic. In such embodiments, decrementing of the first counter for each high priority flow is performed automatically periodically unless the first counter is zero. If the first counter of a high priority flow is smaller than a bandwidth requirement (also called "weight") of the high priority flow, then the decrement amount is equal to the first counter, else the decrement amount is equal to the bandwidth requirement.

Moreover, in such embodiments, prior to the acts of enablement and selection (as per acts 156 and 157), arbitration logic 125 checks if there is any bandwidth leftover at each port (as per act 160) after allocation of bandwidth for high priority flows (as per act 152). If so, arbitration logic 125 allocates such leftover bandwidth for transfer of low priority traffic. When the bandwidth is allocated to low priority traffic, arbitration logic 125 decrements a first counter for each low priority flow to which bandwidth is being allocated (as per act 160). The leftover bandwidth may be allocated only to flows whose first counter is nonzero, thereby to ensure that the leftover bandwidth will be used to transfer traffic. Optionally, the allocation of leftover bandwidth may be done a small fraction at a time over a number of iterations until one or more flows are saturated. The specific allocation of leftover bandwidth to low priority flows may be done differently, depending on the embodiment.

Specifically, several embodiments of the arbiter maintain a counter (hereinafter "used input port bandwidth") for each input port indicative of total decrements during a period in the first counter of each flow between the input port and all output ports, and also maintain a counter (hereinafter "used output port bandwidth") for each output port indicative of a sum of decrements in the first counter of each flow between the output port and all input ports. The difference between the used input port bandwidth and a predetermined input port bandwidth represents the unused bandwidth (also called "leftover input port bandwidth") available at each input port for transfer of low priority traffic. Similarly, the difference between the used output port bandwidth and the maximum output port bandwidth represents the unused bandwidth (also called "leftover output port bandwidth") available at each output port for transfer of low priority traffic.

In many embodiments, the just-described leftover bandwidths are allocated in an iterative manner from the input ports to the output ports, until a flow from an input port to an output port is saturated, at which time the saturated flow is removed from the iteration. A flow is saturated if the bandwidth allocation for the flow cannot be increased because of port bandwidth constraint or because the bandwidth allocated for the flow has reached the bandwidth of a source of the flow. The port bandwidth constraint is reached when the sum of bandwidth of all flows through a port exceeds the maximum bandwidth supported by the port. The iteration may be performed a fixed number of times (e.g. 2 times), or alternatively may be performed until all flows are saturated.

Figure 4:
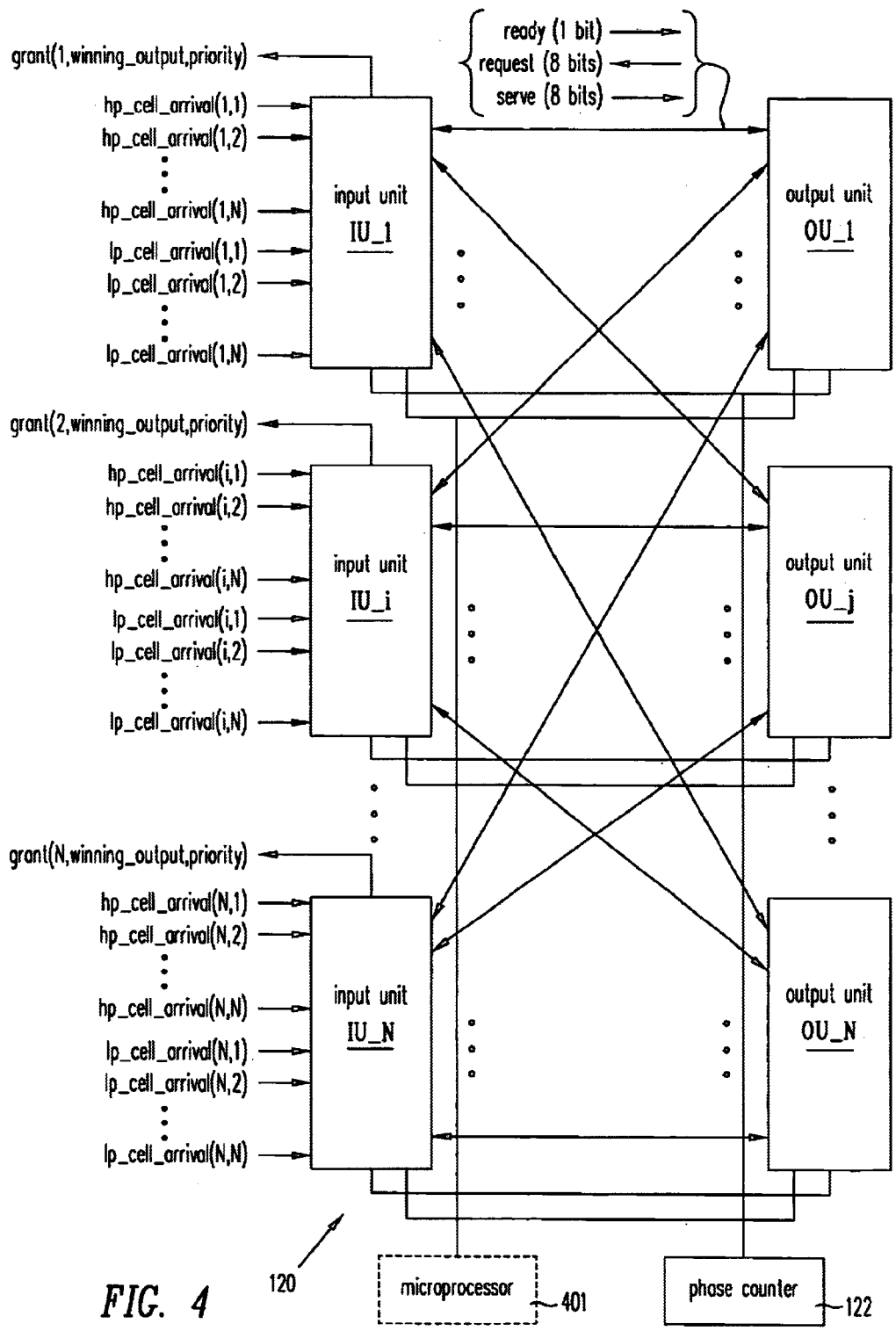
FIG. 4 illustrates, in a block diagram, the arbiter of FIG. 2A in one implementation that contains an input unit for each input port and an output unit for each output port.

Some embodiments of the arbiter provide grant signals for the transfer of asynchronous transfer mode (ATM) cells from the input ports to the output ports of a cross-connect. Several such embodiments simulate inside the arbiter a number of input ports that correspond to input ports of the cross-connect, a number of output ports that correspond to output ports of the cross-connect, and a transfer of fractions of cells (also called "fluid") from each simulated input port (also called "input unit") to each simulated output port (also called "output unit"). Therefore, instead of having a single arbitration logic 125, the logic for arbitration is distributed among all the simulated ports (i.e. among input units IU_1 to IU_N and output units OU_1 to OU_N as illustrated in FIG. 4). The fluid transfer between the simulated input ports IU_1–IU_N and the simulated output ports OU_1–OU_N is performed in a manner unconstrained by the discrete size of each cell, so as to allow arbiter 120 to maintain a historical memory over time of the bandwidth provided to each flow at each input port.

In several such embodiments, an input unit IU_i transmits to each output unit OU_j a signal (hereinafter "readiness signal") as illustrated in FIG. 4. The readiness signal indicates readiness of an input port IU_i to transfer fluid, and is generated only if the first counter of the low priority flow is non-zero and if the leftover input port bandwidth is non-zero. Such readiness signals from all input units IU_1–IU_N are taken into account by an output unit OU_j to determine an amount (hereinafter "requested amount") of fluid from a low priority flow destined to the output unit OU_j from each input unit IU_i, based at least partially on the leftover output port bandwidth. The requested amounts are then indicated by an output unit OU_j (via 8 bit buses) to those of input units IU_1–IU_N that indicated readiness.

A number of request amounts from a corresponding number of simulated output ports OU_1–OU_N are taken into account by each simulated input port IU_i in determining an amount (hereinafter "served amount") of low priority fluid to be transferred from the simulated input port IU_i to the simulated output port OU_j. The served amounts are then used to reduce the leftover input port bandwidth at each ready input unit IU_i, and these served amounts are also identified to the output units that provided the served amounts. The served amounts are then used by each output unit to reduce the leftover output port bandwidth. The just-described acts may be iteratively performed, e.g. 2 times.

Note that although the readiness signal, the requested amount and the served amount are illustrated in FIG. 4 as being 1 bit wide, 8 bits wide, and 8 bits wide respectively these sizes are merely illustrative and any number of bits may be used depending on the embodiment.

In the implementation illustrated in FIG. 4, arbiter 120 includes a counter 402 (called "phase counter") that is set to zero at the beginning of each period, and that is incremented a predetermined number of times (e.g. 10 times) during the period depending on the speed at which arbiter 120 operates. Counter 402 informs the current phase number (e.g. clock cycle number) to each of the input units IU_1–IU_N and output units OU_1–OU_N. Moreover, as illustrated in FIG. 4, arbiter 120 also interfaces with (but does not contain therein) a microprocessor 401 that reads and writes the contents of various registers in the input units IU_1–IU_N and output units OU_1–OU_N. In certain embodiments, microprocessor 401 is used to initialize certain registers, e.g. weights that may be allocated depending on the connections being set up through switch 130.

Referring to FIG. 4, the traffic arrival signal from a voq, for traffic at an input port i destined to an output port j is indicated by the notation "hp_cell_arrival (i, j)." In certain embodiments, each of the lines carrying the traffic arrival signal form a parallel bus (that is 2N bits wide, to accommodate one bit for each voq and one bit to indicate priority of the traffic). Data from the bus is converted into serial form during transmission across a backplane that separates each input port 102I from arbiter 120, and subsequently converted back into parallel form for use by arbiter 120.

Moreover, a grant signal generated by arbiter 120 is indicated by the notation "grant (i, winning_output, priority)" wherein "i" indicates the input port IU_i, winning_output indicates the output port OU_j that has been selected for traffic transfer, and priority indicates whether the low priority flow or the high priority flow has been selected.

Figure 5A:
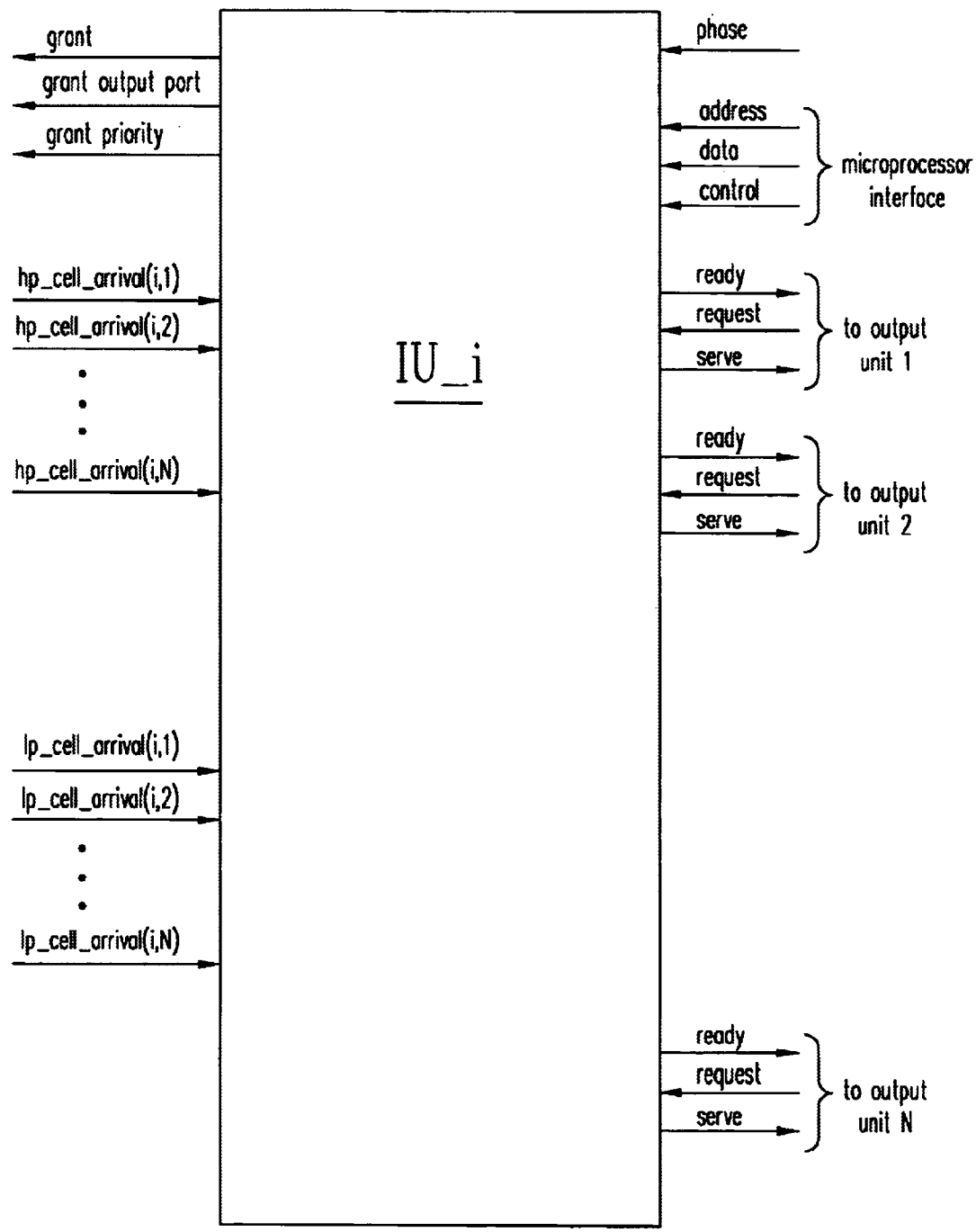
FIGS. 5A and 5B illustrate, in block diagrams, the interfaces of the input port and the output port respectively in one implementation of the embodiment of FIG. 4.
Figure 5B:
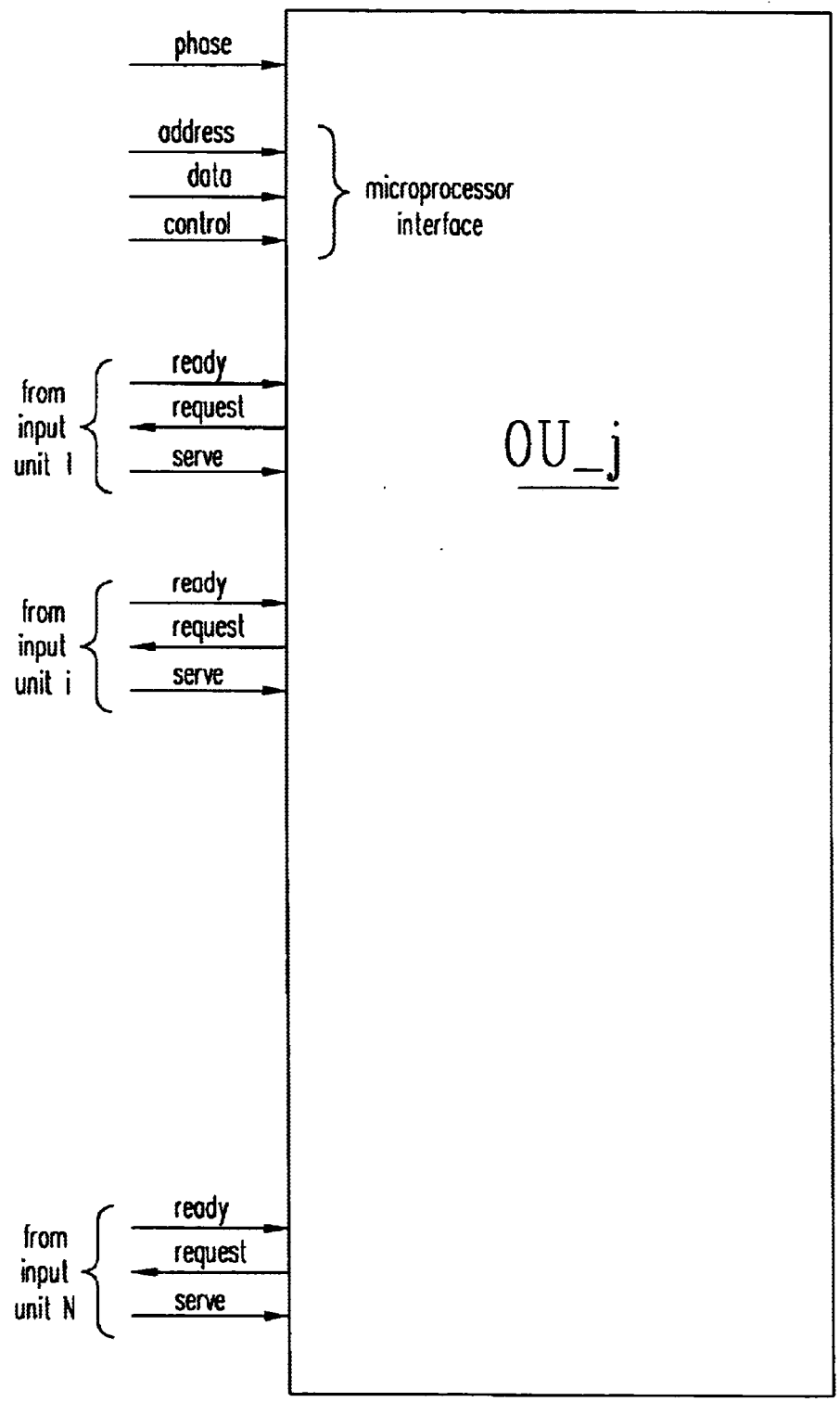

In FIGS. 5A and 5B, internal details of the input unit and output unit respectively are not illustrated, because such circuitry is different, depending on the embodiment. One embodiment of an arbiter for use with a low-speed cross-connect, includes a microprocessor with memory (also called microcontroller) that runs a firmware program that performs the functions of the input unit, the output unit and the fluid flow therebetween. Regardless of the circuitry that is used to implement an input unit and an output unit, each of these units has the signal interface illustrated in FIGS. 5A and 5B. Specifically, each input unit IU_i receives from a controller of each high priority virtual output queue (voq) in the input port i the signal hp_cell_arrival (i, j) for each high priority flow j that is associated with the voq j (not shown individually). Similarly, each input unit IU_i also receives from a controller of each low priority virtual output queue in the input port i the signal lp_cell_arrival (i, j) for each low priority flow j that is associated with a corresponding low priority voq j (not shown). In addition, each input port IU_i has a number of buses that are respectively connected to each output port OU_j. The just-described buses include a "ready" signal and a serve number that are both sent from an input port IU_i to an output port OU_j, and "request" signal that is sent in the opposite direction, from output port OU_j to input port IU_i.

Furthermore, as illustrated in FIGS. 5A and 5B, each input unit IU_i and each output unit OU_j also has a phase bus that indicates a phase (in the form of a number, e.g. in the range 1–10 that increases monotonically once per clock cycle unless it rollover at the end of the range) in which arbiter 120 is currently operating. The phase is used by each input unit IU_i and each output unit OU_j to maintain synchronization with each other. Moreover, each input unit IU_i and each output unit OU_j also has a microprocessor bus that provides an interface to an external microprocessor 401 (FIG. 4), for use during initialization.

Figure 6A:
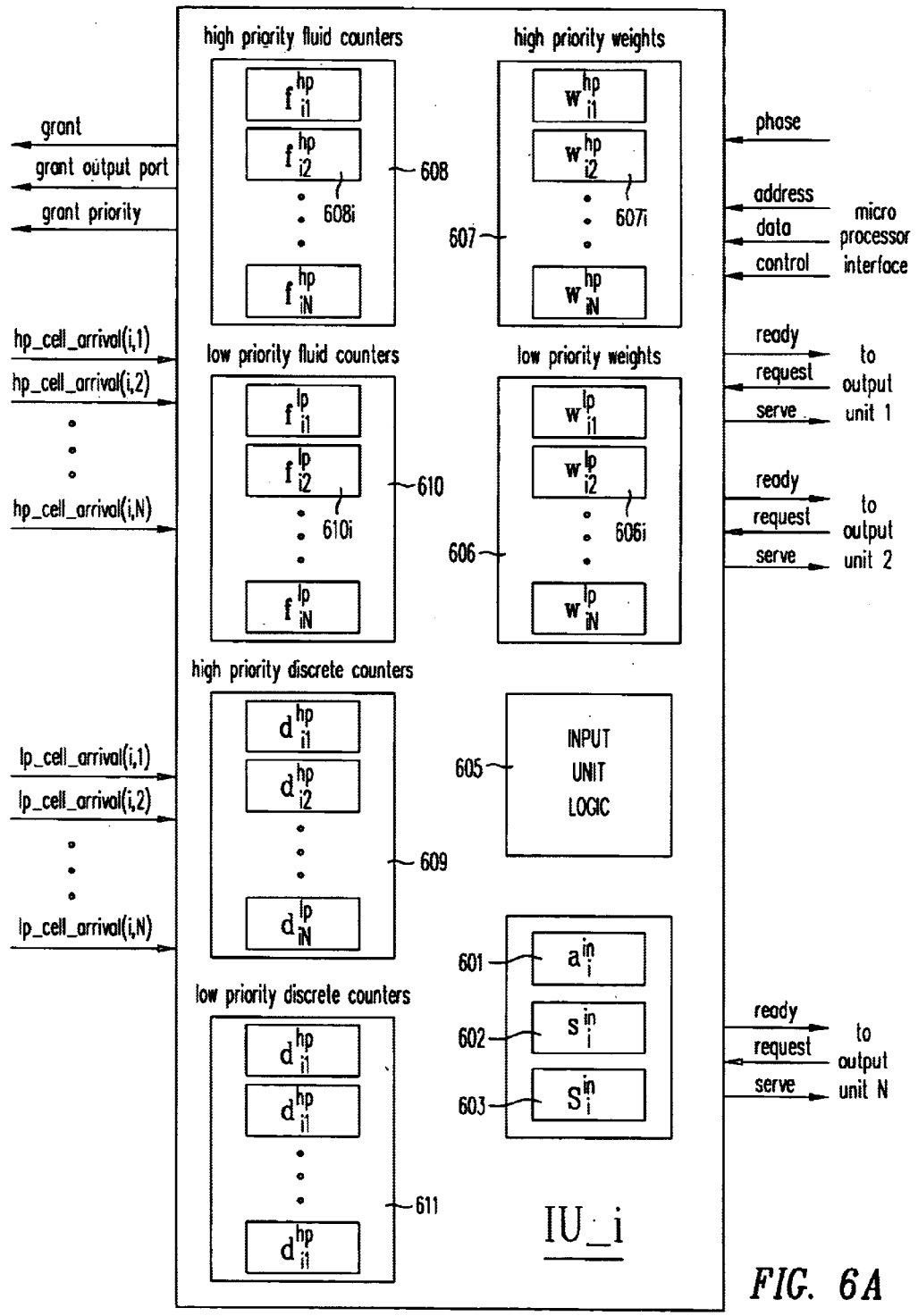
FIGS. 6A and 6B illustrate, in intermediate level block diagrams, counters included in the input port and the output port of FIGS. 5A and 5B.

Registers contained in an ith input unit IU_i of one particular embodiment are illustrated in FIG. 6A. In the following description, these terms are used synonymously:

| | |
|---|---|
| first counter | fluid counter |
| second counter | discrete counter |
| bandwidth requirement | weight |
| used input port bandwidth | $s_1^{in}$ |
| used output port bandwidth | $s_1^{out}$ |

Each input unit IU_i contains N high priority fluid counters 608, N high priority discrete counters 609, N low priority fluid counters 610, N low priority discrete counters 611, N high priority weights 607, and N low priority weights 606, of the flows originating in the ith input unit. Each input unit IU_i also contains a register 601 to store bandwidth being used during the inter-arbitration period, a register 602 to indicate the amount of fluid drained from the input unit and a register 603 to indicate the sum $S_i^{in}$ of weights of the active flows originating in the input unit. Each input unit IU_i also contains a logic 605 (also called "input unit logic") that is connected to each of the just-described counters (also called "registers") to read and/or write the registers in the manner described above (e.g. in reference to the method illustrated in FIG. 3B). For clarity, the connections between logic 605 and the counters are not shown in FIG. 6A.

Figure 6B:
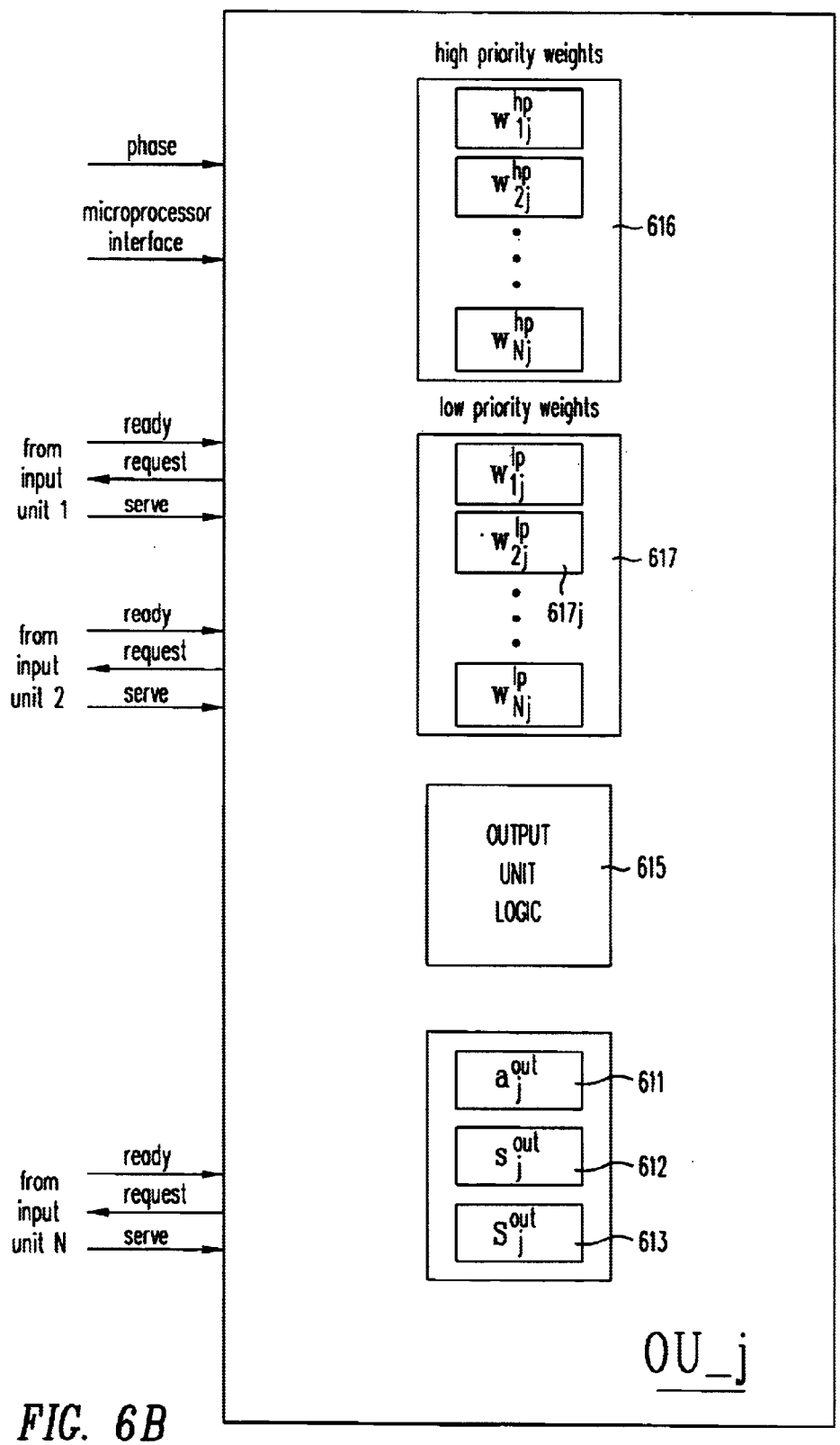

In a similar manner, FIG. 6B illustrates an output unit OU_j containing registers for high priority weights 616 and low priority weights 617 of the flows destined to the jth output unit. FIG. 6B also illustrates registers 611–613 to respectively store bandwidth, the amount of fluid drained to the output unit and the sum of the weights of the active flows destined to the output unit. Output unit logic 615 is also connected to each of the just-described registers, to read and/or write the registers in the manner described above (e.g. in reference to the method illustrated in FIG. 3B). In FIGS. 6A and 6B, internal details of the input unit logic and output unit logic respectively are not illustrated, because such circuitry is different, depending on the embodiment.

Figure 7A:
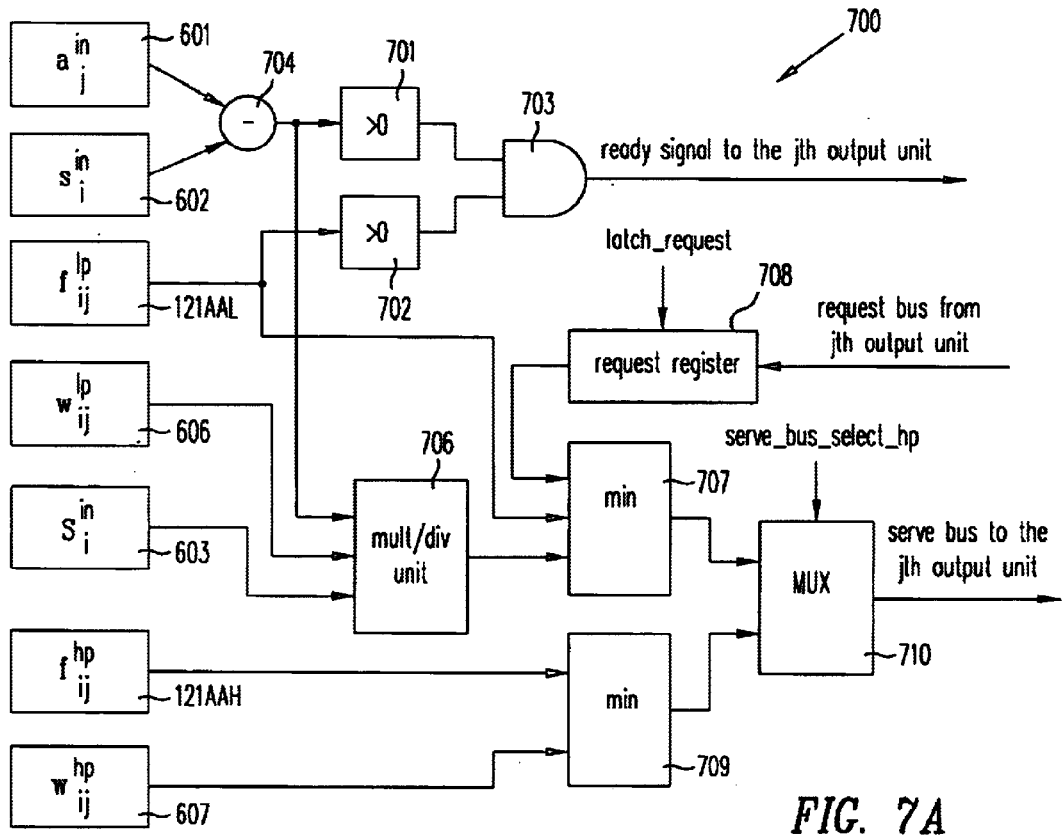
FIGS. 7A–7E illustrate, in low level block diagrams, portions of input unit logic 605 (of FIG. 6A) in one specific implementation.

In one specific implementation, an input unit IU_i includes a circuit 700 (FIG. 7A) for generation of the ready signal (discussed above), and an amount fluid served $\sigma_{ij}$ for a high or low priority flow (also discussed above) which are supplied to an output unit OU_j. The amount fluid served $\sigma_{ij}$ may be determined as discussed below in Addendum A in the description preceding equation (9) and as described in reference to equation (15). In this implementation, as illustrated in FIG. 7A, circuit 700 includes a subtractor 701 that has input lines connected to the above-described registers 601 and 602 (also referred to as $a_j^{in}$ and $s_i^{in}$ registers), and output lines connected to a block 701 of logic to check for non-zero value. Specifically, block 701 checks if the value generated by subtractor 704 is nonzero, and if so drives a signal active to an AND gate 703. AND gate 703 receives its other input signal from another nonzero block 702 that in turn is connected to a counter 121AAL (also referred to as low priority fluid counter $f_{ij}^{lp}$).

As noted above, under certain conditions, input unit IU_i may receive a request for fluid from the output unit OU_j, and the requested amount $\rho_{ij}$ is latched into a register 708 (FIG. 7A) that is also included in circuit 700. The latching is done in response to a signal latch_request becoming active (which goes active in phases 4 and 8 as illustrated in FIG. 12, e.g. due to a signal generator included in input unit logic 605). The latched signal is supplied as a first input signal to a block 707 that finds the minimum value of three input signals. Block 707 receives a second input signal (indicative of the amount of low priority fluid $f_{ij}^{lp}$ in the input unit) from counter 121AAL (also referred to as low priority fluid counter). Block 707 receives a third input signal from a multiply/divide unit 706.

In circuit 700, multiply/divide unit 706 receives three input signals, and provides as output the result of multiplying the first two input signals and dividing the result by the third input signal if the third input signal is nonzero. If the third input signal is zero, then multiply/divide block 706 supplies a zero value to min block 707. In circuit 700, multiply/divide block 706 receives as its first input signal a value generated by subtractor 704, as its second input signal a low priority fluid's weight $w_{ij}^{lp}$ in a register 606i, and as its third input signal a sum of weights of active flows $S_i^{in}$. Block 707 supplies the smallest of ts input signals to a mux 710 that is a 2-to-1 multiplexer. Mux 710 receives as its other input signal a value from a min block 709 that receives two input signals, from each of two registers 121AAH and 607i (also called high priority fluid counter and high priority weight respectively). Mux 710 supplies a signal to the serve bus, under the control of a signal serve_bus_select_hp that causes the serve bus to have the high priority amount when active and a low priority amount when inactive.

Figure 7B:
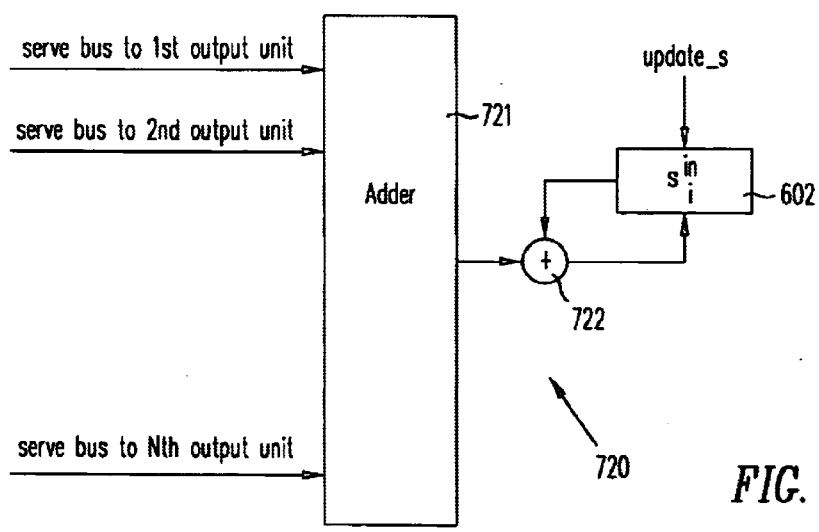

FIG. 7B illustrates, in a low level block diagram, logic 720 in one implementation of the input unit logic 605 of an input unit IU_i (FIG. 6A) for updating of an additional counter 602 (as per equation (16) in Addendum A), to indicate the served amount $s_i^{in}$ (i.e. the used bandwidth). Logic 720 includes an adder 721 that receives as input each of the served amounts from each of output units OU_1–OU_N, and provides the sum to another adder 722 that receives as its other input the total served amount $s_i^{in}$ held in register 602. A control signal update_served_in triggers register 602 to latch the output from adder 722, thereby to cause register 602 to increment the total served amount $s_i^{in}$ by the sum of the amounts in the serve buses to each of the output unit from the ith input unit.

Figure 7C:
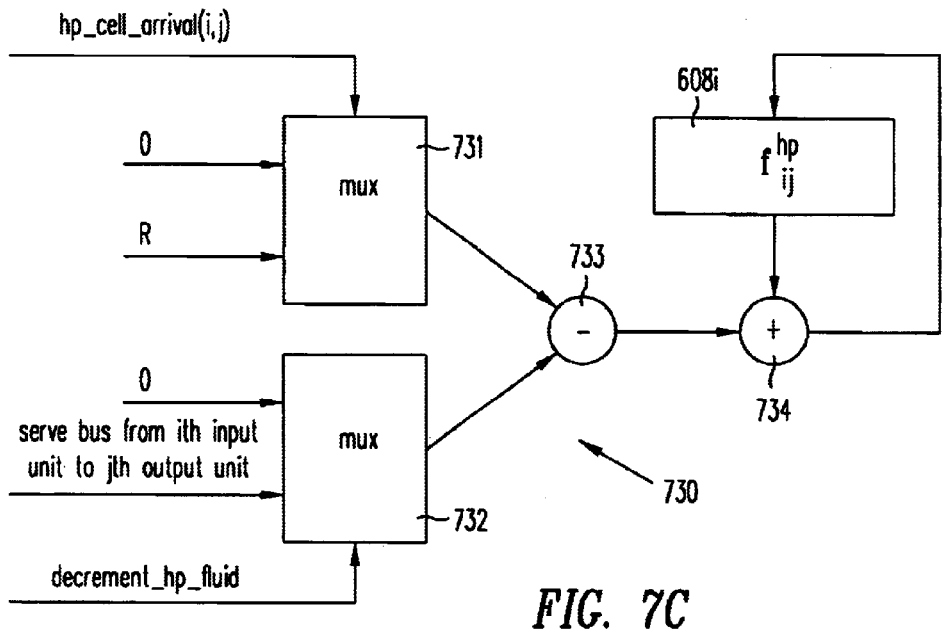
Figure 7D:
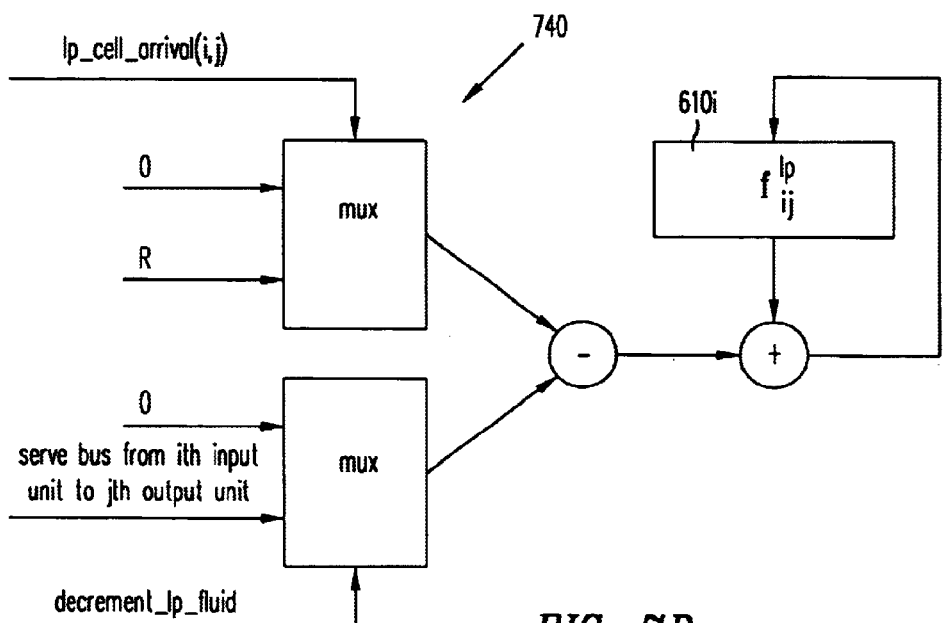

FIGS. 7C and 7D illustrate circuitry in the input unit logic 605 of an input unit IU_i (FIG. 6A) for respectively updating the high and low priority fluid counters 608i and 610i. Referring to FIG. 7C, when the hp_cell_arrival signal is asserted, a multiplexer 731 selects its nonzero input, which is the resolution R and this R value is supplied to a subtractor 733. Subtractor 733 receives as its other input a zero value if signal decrement_hp_fluid is inactive and otherwise receives as its other input the served amount (from the serve bus from the ith input unit to the jth output unit). Therefore, if signal decrement_hp_fluid is inactive the high priority fluid counter 608i is incremented by R, the resolution. When the decrement_hp_fluid control signal is asserted (e.g. by a control signal generator of the type illustrated in FIG. 9B) then the fluid counter 608ii is decremented by the amount found in the serve bus shown. Note the above circuit 730 works as expected when both signals are asserted. The structure and operation of circuitry 740 (FIG. 7D) for low priority fluid is identical to that discussed above for high priority fluid, except that the corresponding quantities for low priority are used.

Figure 7E:
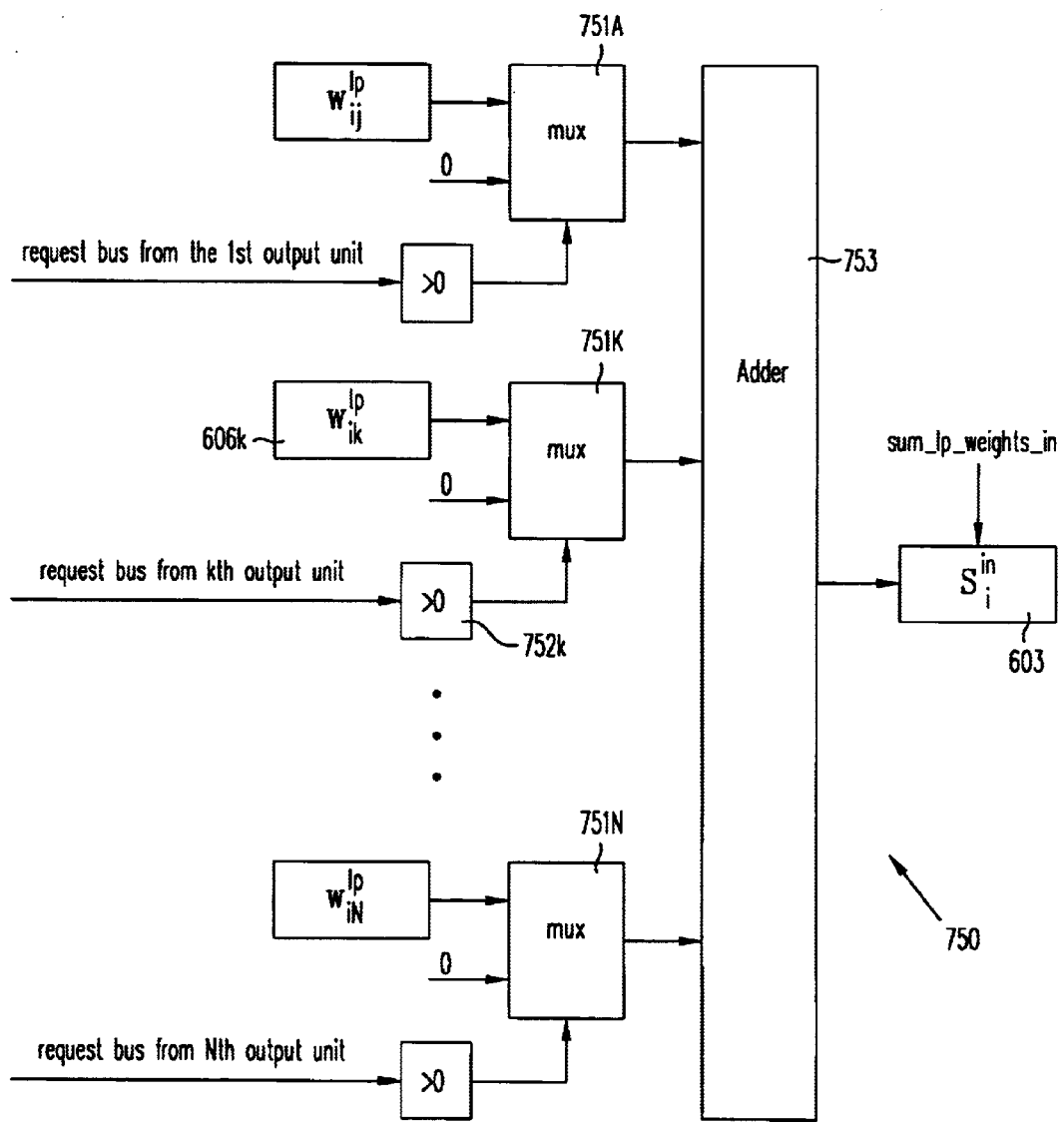

FIG. 7E illustrates, in a low level block diagram, logic in one implementation of the input unit of FIG. 6A for computation of the sum of the weights of the low priority flows with nonzero request originating from the ith input unit. Specifically, an adder 753 receives a signal from each of multiplexers 751A–751N, wherein each multiplexer 751k in turn selects either zero value or the low priority weight $w_{ik}^{lp}$ depending on whether or not the requested amount from the kth output unit is greater than zero (which is checked in a checker 752k). The sum provided by adder 753 is latched in register 603 when signal sum_lp_weights_in goes active (e.g. in phases 5 and 9).

Figure 8A:
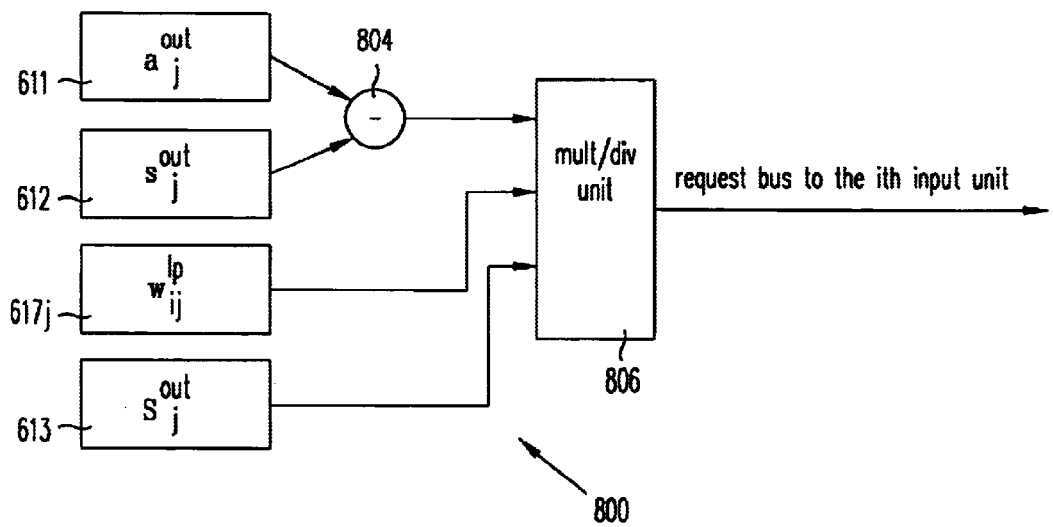
FIGS. 8A–8C illustrate, in low level block diagrams, portions of output unit logic 615 (of FIG. 6B) in one specific implementation.

FIG. 8A illustrates, in a low level block diagram, logic in one implementation of the output unit of FIG. 6B for computation of request amount to the ith input unit. Specifically, the circuitry 800 includes a multiply/divide unit 806 that receives three input signals: a first signal from subtractor 804, a second signal from register 617j that identifies the low priority weight $w_{ik}^{lp}$ and a third input from register 613 (described above) that contains the total amount of fluid $s_i^{out}$ that is transferred to the ith output port during the current period. Multiply/divide unit 806 and subtractor 804 operate in a manner similar or identical to the corresponding items in circuit 700 described above, namely multiply/divide unit 706 and subtractor 704.

Figure 8B:
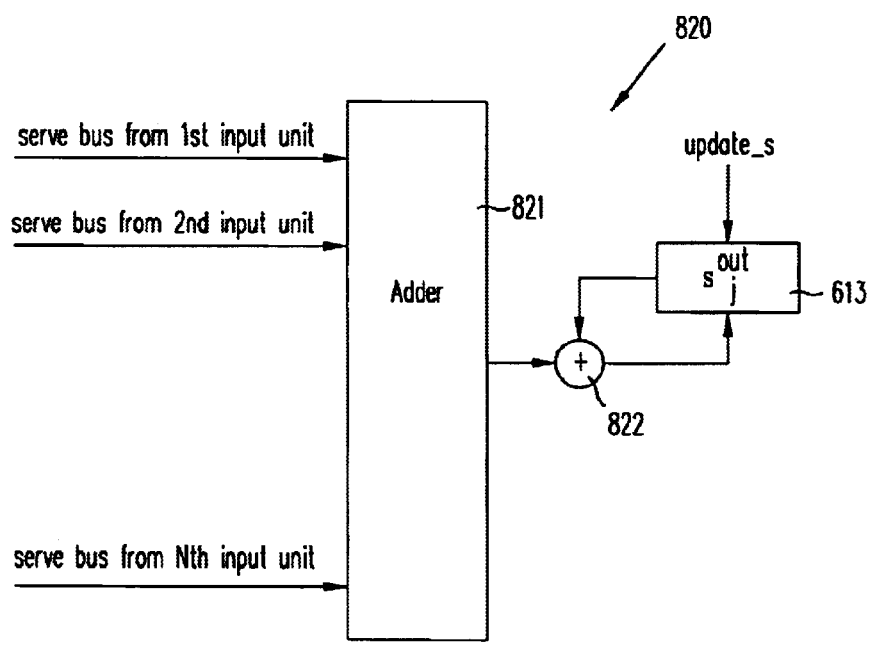

FIG. 8B illustrates, in a low level block diagram, logic 820 in one implementation of the output unit of FIG. 6B for computation of the amount of fluid served $s_i^{out}$ that is held in register 613, as per equation (18) in Addendum A. Logic 820 is similar in structure and function to logic 720 described above in reference to FIG. 7B, except that output quantities are used instead of input quantities.

Figure 8C:
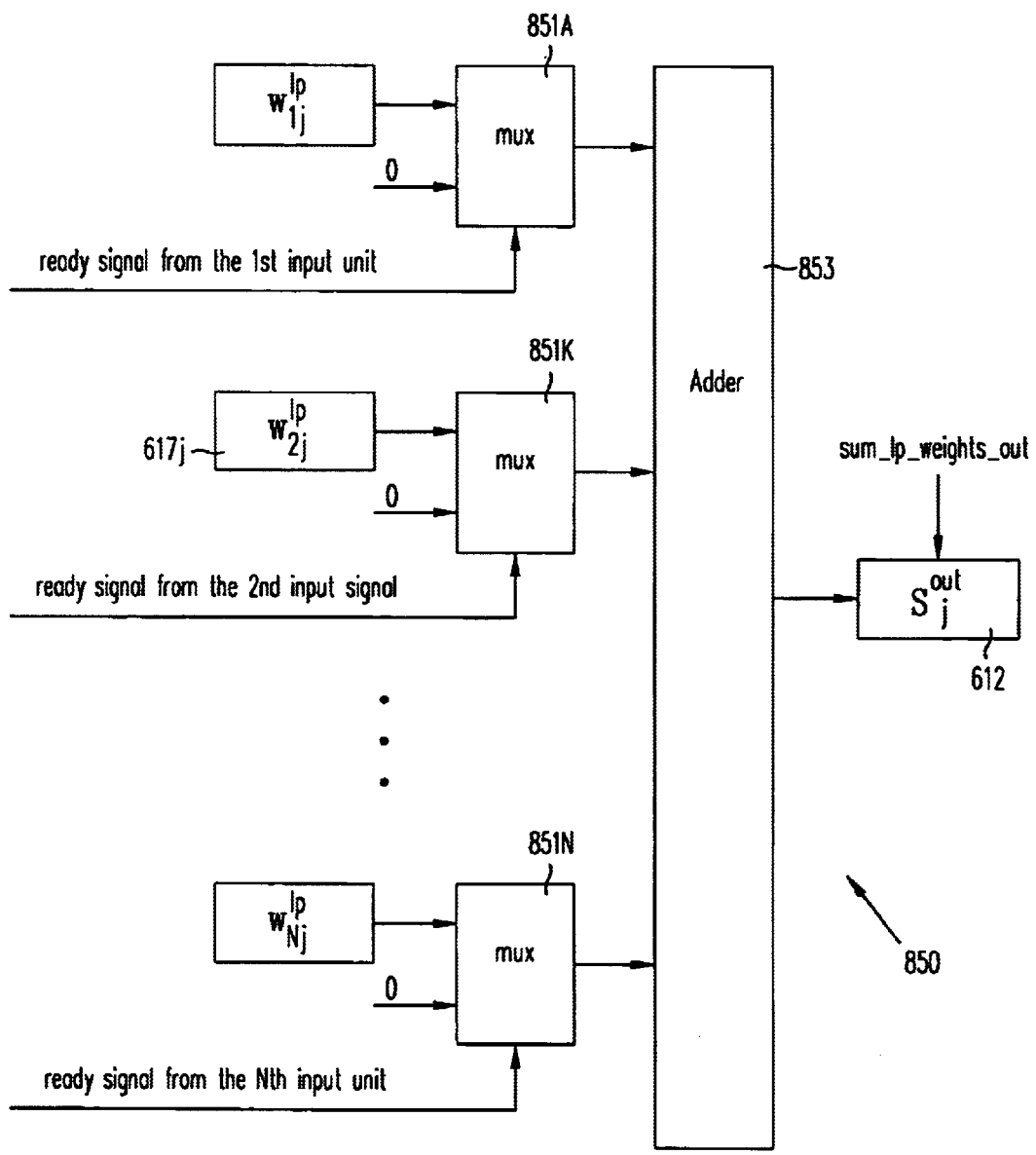

FIG. 8C illustrates, in a low level block diagram, logic 850 in one implementation of the output unit of FIG. 6B for computation of the sum of low priority weights of flows with the ready signal asserted. Logic 850 is similar in structure and function to logic 750 described above in reference to FIG. 7E, except that a checker 752k is not required because the ready signal is a single bit signal that directly controls operation of mux 851k.

Figure 9A:
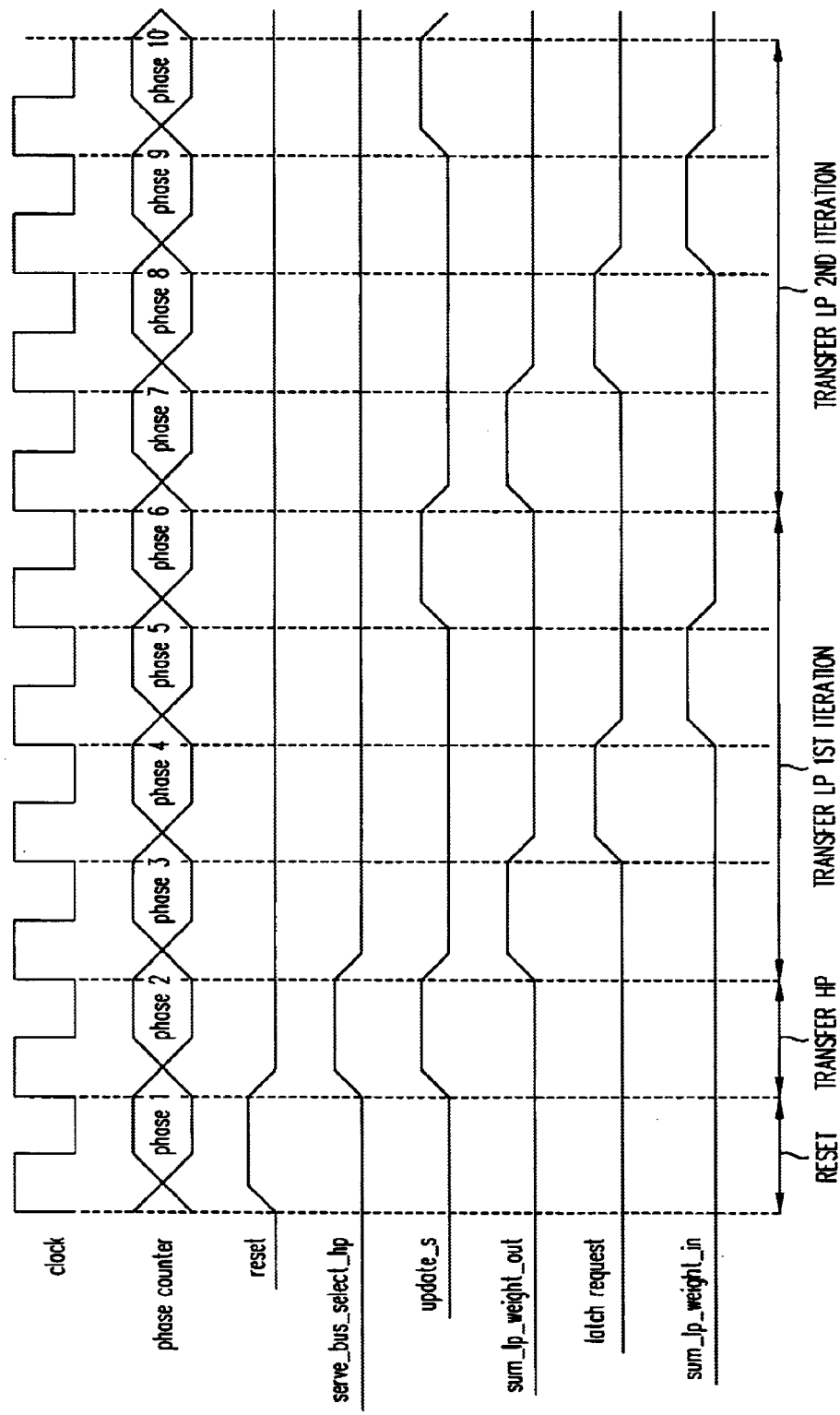
FIG. 9A illustrates, in a timing diagram, the order in which control signals are generated by one embodiment of an arbiter for use with the circuitry illustrated in FIGS. 7A–7E and 8A–8C.
Figure 9B:
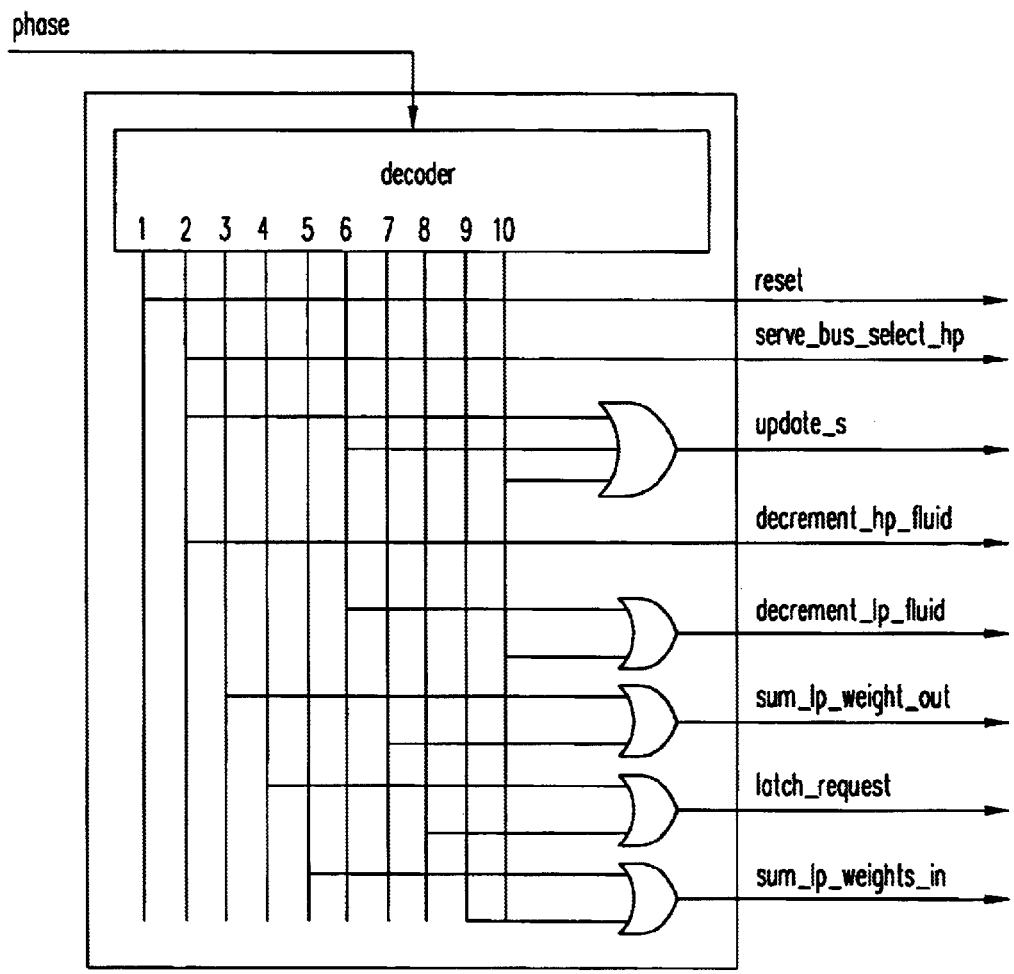
FIG. 9B illustrates, in a low-level block diagram, circuitry for generation of the control signals of FIG. 9A.

A number of control signals for use with logic in the input and output ports are generated as per the timing chart illustrated in FIG. 9A. FIG. 9B illustrates generation of these signals based on a phase count, by simply using a decoder to generate ten signals that are individually active in the respective ten sub-intervals of the current period. Therefore, if the current period lasts 10 clock cycles, then ten signals are generated (one per clock cycle), and each signal is active in a different subinterval. Each control signal that needs to be active in a particular subinterval is derived from a corresponding active signal from among the 10 active signals.

Some embodiments of the arbiter allocate bandwidth for low priority traffic as follows: (1) increment the used input port bandwidth (see FIG. 7B) and used output port bandwidth (FIG. 8B) by a value based on one or more of: (a) the leftover input port bandwidth, (b) the requested amount, and (c) the weight of the low priority flow from the input port (as illustrated by a "min" block 707 in FIG. 7A) (2) decrement the first counter for the low priority flow by the just-described increment value (see FIG. 7D), and (3) generate a served amount indicative of the just-described increment value (see FIG. 7A). The acts of (1) incrementing the used input port bandwidth, (2) decrementing the second counter and (3) generating the served amount may be repeated one or more times, to ensure that no bandwidth is left unused.

Numerous such modifications and adaptations of the embodiments described herein will be apparent to the skilled artisan in view of the disclosure.

For example, instead of transferring fixed-length cells, in an alternative embodiment, the cross-connect transfers variable-length packets. In such an alternative embodiment, instead of incrementing a flow at an input port by a fixed amount on arrival of a cell, the flow is incremented by a variable amount proportional to the length of the packet on arrival of the packet. Furthermore, in certain embodiments, instead of an arbiter of the type described herein controlling an electrical cross-connect switch, the arbiter may control an optical switch, and instead of time slots, bandwidth in the form of one or more wavelengths is assigned to each input port for transfer of traffic through the optical switch. Although in some embodiments a single processor is used in each simulated input port and each simulated output port of the arbiter, in other embodiments different processors may perform the individual acts of a method of the type described herein so that these processors together as a group perform such a method.

Moreover, some embodiments may have more than two counters associated with each flow that are maintained by an arbiter, in which case at least two counters are maintained in the manner described herein for the first counter and the second counter. Although in some embodiments the first counter (also called "fluid counter") has greater resolution than the second counter (also called "discrete counter"), in other embodiments both counters may have the same resolution in which case the two counters are decremented differently: the second counter is decremented by a fixed amount that is larger than (e.g. one or two orders of magnitude larger than) the smallest amount by which the first counter is decremented.

Also, although described in the context of an arbiter, one or more structures of the arbiter and/or one or more acts of the method performed by the arbiter can be used in other devices. For example, a scheduler that schedules flow of traffic through a single port of a switch may perform the acts of (1) incrementing a pair of counters for a flow of traffic from an input port destined to an output port, in response to receipt of traffic at the input port, (2) decrementing a first counter in the pair of counters for each flow if the first counter is nonzero, (3) selecting a winning input port based at least partially on values of counters in the pair for at least one flow from the input port, and (4) generating a signal to transfer an amount of traffic from the winning input port, to the output port.

Numerous such modifications and adaptations of the embodiments described herein are encompassed by the attached claims.

Addendum A, Addendum B and Addendum C are integral portions of this detailed description, and are set forth below. Addendum A illustrates various principles for use in designing an arbiter of the type described herein. Addendum B provides an architectural specification for an arbiter designed based on the principles in Addendum A. Addendum C provides context for implementation of one example of an arbiter of the type described herein. In addition, the attached software appendix illustrates the construction and operation of an arbiter in accordance with the invention, in the form of a discrete event simulation.

Addendum A

The Generalized Processor Sharing (GPS) Fair Arbitration is described below:

Let $r_{ij}$ be the bandwidth allocated to the flow of cells from the ith input port to the jth output port. If the port bandwidths are all equal to L and all the weights are equal, then fairness implies $r_{ij} = L/N$ for all i and j in $\{1, 2, \ldots, N\}$. We wish to extend the definition of fairness when the weights are not all equal and when port bandwidth are widely different.

A natural way of defining fairness is in terms of fluid flows. This is similar to the approach of defining (GPS) fairness for (weighted) service scheduling schemes of ATM multiplexers. Let $r_i(t)$ be the bandwidth received by the flow from the ith input port to the output port. Let $w_i$ be the weight assigned to the ith input port. Let B(t) denote the set of backlogged input ports at time t and L be the bandwidth of the output link. A scheduling scheme is said to be GPS fair if the set $r_i(t)$, $1 \leq i \leq N$ is the unique solution to the following optimization problem: Minimize $$\left( \max_{i,j \in B(t)} \max_{t \geq 0} \left| \frac{r_i(t)}{w_i} - \frac{r_j(t)}{w_j} \right| \right) \quad (1)$$

subject to the condition $\sum_{i \in B(t)} r_i(t) = L$.

The above definition of fairness of weighted service scheduling can be extended to the weighted arbitration. Let $w_{ij}$ be the weight of the flow from the ith input port to the jth output port. Let $B(t) \subseteq \{(i, j): 1 \leq i \leq N, 1 \leq j \leq N\}$ be the subset of backlogged virtual output queues (voqs) at time t. Let $L_i^{in}$ ($L_j^{out}$) be the bandwidth of the ith input (resp. output) port. An arbitration scheme is said to be GPS fair if the set $r_{ij}(t)$, $1 \leq i \leq N$, $1 \leq j \leq N$ is the unique solution to the following optimization problem: Minimize $$\left( \max_{i,j,k,l \in B(t)} \max_{t \geq 0} \left| \frac{r_{ij}(t)}{w_{ij}} - \frac{r_{kl}(t)}{w_{kl}} \right| \right) \quad (2)$$

subject to the following conditions:

$$\sum_{i:(i,j) \in B(t)} r_{ij}(t) = L_j^{out} \text{ and} \quad (3)$$

$$\sum_{j:(i,j) \in B(t)} r_{ij}(t) = L_i^{in}. \quad (4)$$

There is a simple algorithm for computing the solution for the optimization problem (2). Increase the bandwidth, $r_{ij}$, allocated to the flow from the ith input port to the jth output port, for all i and j in $\{1, 2, \ldots, N\}$ by $w_{ij}\Delta$, where $\Delta$ is a small amount, until one or more flows cannot be increased further because of port bandwidth constraint or because $r_{ij}$ reached the source rate of the flow from the ith input port to the jth output port. Such a flow is called a saturated flow. Continue increasing the unsaturated flows until one or more of them becomes saturated. Iterate until all flows are saturated. The resulting set of rates, $r_{ij}$, is the solution to the optimization problem (2).

When we have two priority classes, then high priority rates are directly specified by the weights and the low priority rates are solutions to the optimization problem (2) with $L_j^{out}$ and $L_i^{in}$ in conditions (3) and (4) replaced by the leftover bandwidths:

$$\sum_{i:(i,j) \in B(t)} r_{ij}(t) = L_j^{out} - R_j^{hp\ out} \text{ and} \quad (5)$$

$$\sum_{j:(i,j) \in B(t)} r_{ij}(t) = L_i^{in} - R_i^{hp\ in}. \quad (6)$$

where $R_j^{hp\ out}$ ($R_i^{hp\ in}$) is the total bandwidth used by the high priority traffic in the jth output port (resp. ith input port).

The Fluid Flow Tracking Arbiter (FFTA) is described below:

For each input-output pair (i, j), the FFTA has two counters: the discrete request counter $d_{ij}$ and the fluid request counter, $f_{ij}$. When a request is received by the ith input port for the jth output port, both $d_{ij}$ and $f_{ij}$ are incremented by one cell.

FFTA simulates fluid flows from the input ports to the output ports according to the weights of the flows in the GPS fair manner described on page 21. For the ith input port, the FFTA grants to the jth output port whose discrete request backlog $d_{ij}$ lags the most with the corresponding fluid request backlog, $f_{ij}$. And the selected $d_{ij}$ is decremented by one cell.

The variables used by the Fluid Flow Tracking Arbiter (FFTA) are described below:

To support two classes of services, high priority and low priority, we need four counters for each input-output pair: $d_{ij}^{hp}$, $f_{ij}^{hp}$, $d_{ij}^{lp}$ and $d_{ij}^{lp}$. The discrete request counters assume only integer values, whereas the fluid request counters need to represent fractions of cells. Rather than using expensive floating point arithmetic for fluid request counters, integer counters can be used where a single unit represents a fraction, 1/R, of a cell. We will refer to R as the fluid resolution. If the discrete request counters need k bits, then the fluid request counters will need $k+\lceil \log_2 R \rceil$ bits. A suitable value for R is 256, which means that the fluid request counters will need 8 bits more than the discrete request counters.

The arbiter grants every inter-arbitration interval which is equal to the intercell interval in the switching fabric. A convenient way of specifying bandwidth of a flow or of a port is in terms of the fraction of cell per inter-arbitration interval. For example, if the arbiter operates at 2.5 Gbits/s bandwidth, then the inter-arbitration interval is 169600 picoseconds (ps). A port with 625 Mbits/sec bandwidth will have 0.25 cell per the inter-arbitration interval.

Let $a_i^{in}$ denote the bandwidth of the ith input port in cell per inter-arbitration interval. And let $a_j^{out}$ denote the bandwidth of the jth output port in cell per inter-arbitration interval.

Each input-output pair also has two weights, $w_{ij}^{hp}$ and $w_{ij}^{lp}$. The high priority weight, $w_{ij}^{hp}$, specifies the bandwidth of the flow from the ith input port to the jth output port. It is specified as the fraction of cell per the inter-arbitration interval. The high priority class is a guaranteed bandwidth service class and there is no overbooking in this class. Hence, the high priority weights satisfy the following inequalities.

$$\sum_{i=1}^{N} w_{ij}^{hp} \le a_j^{out} \quad (7)$$

and $$\sum_{j=1}^{N} w_{ij}^{hp} \le a_i^{in} \quad (8)$$

The low priority service is an overbookable service where the $w_{ij}^{lp}$'s are dimensionless (non-negative) quantities. Roughly, the bandwidth received by a low priority flow from the ith input port to the jth output port is proportional to the weight $w_{ij}^{lp}$ but the exact amount of bandwidth received by the flow depends on several factors such as the total amount of high priority traffic, the port bandwidths and the amount of overbooking on the jth output port. Note that VCs are admitted so that there is no overbooking at the input ports.

The other quantities used by the FFTA are $s_i^{in}$ and $s_i^{out}$. $s_i^{in}$ is the total amount of fluid transferred from the ith input port during the current inter-arbitration interval. Note that $s_i^{in}$ satisfies the bound: $0 \le s_i^{in} \le a_i^{in}$. Similarly, $s_j^{out}$ is the amount of fluid transferred to the jth output port during the current inter-arbitration interval and it satisfies the bound: $0 \le s_j^{out} \le a_j^{out}$.

The variables used by the FFTA are summarized in Table 1.

TABLE 1

The variables used by the FFTA.

| name | description |
|---|---|
| $d_{ij}^{hp}$ | The high priority discrete request counter. |
| $d_{ij}^{lp}$ | The low priority discrete request counter. |
| $f_{ij}^{hp}$ | The high priority fluid request counter. |
| $f_{ij}^{lp}$ | The low priority fluid request counter. |
| $w_{ij}^{hp}$ | The high priority weight. |
| $w_{ij}^{lp}$ | The low priority weight. |
| $a_i^{in}$ | The ith input port bandwidth in cell per inter-arbitration interval. |
| $a_i^{out}$ | The ith output port bandwidth in cell per inter-arbitration interval. |
| $S_i^{in}$ | The amount of fluid (both hp and lp) transferred from the ith input port during the current inter-arbitration interval. |
| $S_i^{out}$ | The amount of fluid (both hp and lp) transferred to the ith output port during the current inter-arbitration interval. |

The structure of the FFTA is shown in FIG. 4, where hp_request(i,j) denotes the high priority request by the ith input port for access to the jth output port. Similarly, lp_request(i,j) denotes the low priority request by the ith input for the jth output port. The bus used to connect arbiter input units to the output units consists of three sub-buses. The single bit ready signal indicates that the input unit has (low priority) fluid available for the output unit. The $[\log_2 R]$-bit request bus indicates the amount of (low priority) fluid requested by the output unit to the input unit and the $[\log_2 R]$-bit serve bus indicates the amount of (low priority) fluid served by the input unit to the output unit.

The ith input unit contains the $d_{ij}^{hp}$, $d_{ij}^{lp}$, $f_{ij}^{hp}$, $f_{ij}^{lp}$ for $1 \le j \le N$. It also contains $s_i^{in}$ and $a_i^{in}$. The jth output unit contains $s_j^{out}$ and $a_j^{out}$. The weights $w_{ij}^{hp}$ and $w_{ij}^{lp}$ are accessible by both the ith input unit and the jth output unit.

Whenever the high (low) priority request signal to the ith input port for the jth output port is asserted, both $d_{ij}^{hp}$, and $f_{ij}^{hp}$ (resp. $d_{ij}^{lp}$, and $f_{ij}^{lp}$) are incremented by one cell. Since one cell is equal to R units, the fluid counter is incremented by R units.

Every inter-arbitration interval, the FFTA performs two tasks in parallel. The first task transfers fluid from the input ports to the output ports and the second task computes grants by observing the differences between the discrete and fluid request counters. These tasks are done in parallel because grants can be computed based on the differences in fluid and discrete request backlogs in the previous inter-arbitration interval.

The transfer of fluid is described below:

Table 2 shows the operations performed at each clock cycle within an inter-arbitration interval to transfer fluid from the input ports to the output ports. The high priority fluid can be transferred in one clock cycle whereas the transfer of low priority fluid, which is used to fill the leftover bandwidth proportional to the low priority weights, requires request-serve iterations. The output ports request for low priority fluid to the input ports and the input port serves low priority fluid to the requesting output ports. In Table 2, two low priority iterations are shown. The first iteration is done from clock cycle 3 to 6 and the second iteration is done from clock cycle 7 to 10. The details of the individual operations are given below.

In the first clock cycle, the ith input port sets $s_{ij}^{in}$ to 0 and the jth input port sets

TABLE 2 transfer fluid procedure operations at each clock cycle

| clock cycle | operation(s) |
|---|---|
| 1 | reset $S_i^{in}$ and $S_i^{out}$ to 0 for $1 \le i \le N$. |
| 2 | transfer hp fluid |
| 3 | compute sum of lp weights at outputs |
| 4 | lp requests by outputs |
| 5 | compute sum of lp weights at inputs |
| 6 | lp service by inputs |
| 7 | compute sum of lp weights at outputs |
| 8 | lp requests by outputs |
| 9 | compute sum of lp weights at inputs |
| 10 | lp service by inputs |

$s_{ij}^{in}$ to 0.

In the sequel, the variable $\rho_{ij}$ denotes the amount of fluid requested by the jth output port to the ith input port via the request bus and $\sigma_{ij}$ denotes the amount of fluid served by the ith input unit for the jth output unit via the serve bus.

In the second clock cycle, the ith input port sets the serve bus connected to jth output unit to $\sigma_{ij}=\min(w_{ij}^{hp}, f_{ij}^{hp})$. The following operations are also performed in the second clock cycle:

$$s_i^{in} \leftarrow s_i^{in} + \sigma_{ij} \qquad (9)$$

$$f_{ij}^{hp} \leftarrow f_{ij}^{hp} - \sigma_{ij} \qquad (10)$$

$$s_j^{out} \leftarrow s_j^{out} + \sigma_{ij} \qquad (11)$$

The ith input performs the first two operations and the jth output port performs the last operation. Note that essentially, the amount of high priority fluid transferred from the ith input port to the jth output port is equal to the high priority weight, $w_{ij}^{hp}$. The min( ) operation ensures that the amount of fluid transferred does not exceed the amount of fluid in the (i, j)th high priority fluid request counter $f_{ij}^{hp}$. Also, note that, at the end of this cycle, $s_i^{in} \leq a_i^{in}$ and $s_j^{out} \leq a_j^{out}$ because the inequalities (7) and (8) on page 24 are satisfied by the high priority weights.

In the third clock cycle, the ith input unit asserts the ready signal to the jth output unit, if $(f_{ij}^{lp}>0)$ and $(s_i^{in}<a_i^{in})$. In other words, the ready signal is asserted if and only if the ith input unit has low priority fluid available for the jth output unit and the limit on the total amount of fluid that can be drained from the ith input port has not been reached. The jth output unit computes the sum of the low priority weights, $S_j^{out}$, over all input units that have asserted the ready signal:

$$S_j^{out} = \sum_{i: (f_{ij}^{lp}>0) \wedge (s_i^{in}<a_i^{in})} w_{ij}^{lp} \qquad (12)$$

In the fourth clock cycle, the jth output unit sets the request bus to the ith input unit to $\rho_{ij}$, where $$\rho_{ij} = \begin{cases} \dfrac{(a_j^{out} - s_j^{out}) \times w_{ij}^{lp}}{S_j^{out}} & \text{if } S_j^{out} > 0 \\ 0 & \text{otherwise} \end{cases} \qquad (13)$$

In the fifth clock cycle, the ith input unit computes the sum, $S_i^{in}$, of the low priority weight, $w_{ij}^{lp}$ over all j (outputs) with nonzero request $(\rho_{ij}>0)$.

$$S_i^{in} = \sum_{j: \rho_{ij}>0} w_{ij}^{lp} \qquad (14)$$

In the sixth clock cycle, the ith input unit computes the amount of low priority fluid to serve, $\sigma_{ij}$, to the jth output unit as follows and places the value in the serve bus.

$$\sigma_{ij} = \begin{cases} \min\left(\dfrac{(a_i^{in} - s_i^{in}) \times w_{ij}^{lp}}{S_i^{in}}, f_{ij}^{lp}, \rho_{ij}\right) & \text{if } S_i^{in} > 0 \\ 0 & \text{otherwise} \end{cases} \qquad (15)$$

The following three operations are also performed in the sixth clock cycle:

$$s_i^{in} \leftarrow s_i^{in} + \sigma_{ij} \qquad (16)$$

$$f_{ij}^{lp} \leftarrow f_{ij}^{lp} - \sigma_{ij} \qquad (17)$$

$$s_j^{out} \leftarrow s_j^{out} + \sigma_{ij} \qquad (18)$$

Again, the first two operations are performed by the ith input unit and the last operation is performed by the jth output unit. Note the difference between these operations and the ones performed in the second clock cycle. In the second clock cycle, $f_{ij}^{hp}$ was decremented whereas in the sixth clock cycle, $f_{ij}^{lp}$ is decremented.

The clock cycles 3 to 6 perform a single iteration of the low priority fluid request-serve cycle. These steps are repeated in clock cycles 7 to 10 for the second iteration. If there are sufficient clock cycles available in the inter-arbitration interval a third iteration can also be done. The number of clock cycles per inter-arbitration interval is determined by the speed of the arbiter versus the clock speed. An arbiter operating at 2.5 Gbits/sec and clocked by a 155.52 MHz clock has 24 clock cycles per inter-arbitration interval.

In summary, the high priority fluid transfer is determined primarily by the high priority weight and the low priority fluid is transferred using an algorithm similar to the one described.

The computing of grants is described below:

As already mentioned, the task of computing grants is performed in parallel to the task of transferring fluid described above. Each input unit (see FIG. 4) computes the grants by finding the output port with the largest difference between the discrete and fluid request counters. Consider the ith input unit. The jth output port is said to be eligible for winning if either $$d_{ij}^{hp} - f_{ij}^{hp} > \frac{R \times i}{N} \qquad (19)$$

or $$d_{ij}^{lp} - f_{ij}^{lp} > \frac{R \times i}{N} \qquad (20)$$

Note that an output port is made eligible at different time for each input port. Such staggered enabling minimizes the probability of burst of grants for the same output port to different input ports.

Let $E_i$ be the set of output ports eligible for ith input port at the current instant. The ith input port finds an output port, $j_w$, and a priority, $p_w$, such that $$d_{ij_w}^{p_w} - f_{ij_w}^{p_w} \geq d_{ij}^{hp} - f_{ij}^{hp} \text{ and} \qquad (21)$$

$$d_{ij_w}^{p_w} - f_{ij_w}^{p_w} \geq d_{ij}^{lp} - f_{ij}^{lp} \text{ and} \qquad (22)$$

In other words, the winning output port and the winning priority pair, $(j_w, p_w)$, maximize the difference between the discrete request and the fluid request backlog among all eligible output ports of the ith input port. The ith input port unit sends a grant to the ith input port for the $j_w$ output port and priority $p_w$. Note that, to reduce hardware, the finding an eligible output port with the maximum difference can be done over a number of clock cycles.

Addendum B

One embodiment of the arbiter (also called FFTA) has the following features:

1. Bandwidth controllability: Let $w_{ij}^{hp}$ ($w_{ij}^{lp}$) be the high priority (low priority) weight for the flow from the ith input port to the jth output port. The bandwidth received by the high priority flow is ($w_{ij}^{hp}$/WEIGHT_RESOLUTION*OC48_RATE). That is, each unit of the high priority weight represent an absolute bandwidth of (OC48_RATE/WEIGHT_RESOLUTION).

A WEIGHT_RESOLUTION of 256 implies that the weights are 8-bit quantities. On the other hand, the bandwidth received by the low priority flow is $$(\frac{w_{ij}^{lp}}{\sum_{i \in A} w_{ij}^{lp}} * \text{BW\_AVAILABLE\_FOR\_LP}).$$

The sum in the denominator is over all active input ports feeding low priority traffic to the output port and BW_AVAILABLE_FOR_LP is the output link bandwidth minus the bandwidth used by the high priority flows.

2. 100% Throughput: Simulation study showed that the FFTA provides 100% throughput under most conditions.
3. Facilitates Multi-QoS support: The FFTA is based on a flexible framework, which facilitates multi-QoS support
4. Facilitates Multicast and Bridging support: The flexible framework of the FFTA can be used to support multicasting and bridging without sacrificing throughput and without requiring any additional switch speedup nor additional hardware in the arbiter.

The FFTA simulates a fluid flow from the input ports to the output ports in such a way that the amount of fluid that flows from an input port to the output port satisfies the bandwidth requirement. The FFTA schedules grants so that the traffic flow tracks the simulated fluid flow as closely as possible. This is done by sending grants to the input-output pair whose packet flow lags the most with respect to the corresponding fluid flow.

Variables used by the FFTA include a number of weights. Let $w_{ij}^{hp}$ ($w_{ij}^{lp}$) be the high priority (low priority) weight of the flow from the ith input to the jth output port. Let $R_i^{out}$ ($R_i^{in}$) be the asynchronous bandwidth of the ith output (input) port. Then, as already described, the bandwidth received by the high priority flow is ($w_{ij}^{hp}$/WEIGHT_RESOLUTION*OC48_RATE) and the bandwidth received by the low priority flow is $$(\frac{w_{ij}^{lp}}{\sum_{i \in A} w_{ij}^{lp}} * \text{BW\_AVAILABLE\_FOR\_LP}).$$

A packet VOQ length counter is maintained by the FFTA as follows. Let $p_{ij}^{hp}$ ($p_{ij}^{lp}$) be the length of the jth high (low) priority VOQ in the ith input port. $p_{ij}^{hp}$ ($p_{ij}^{lp}$) is incremented whenever, the VOQC of the ith input port informs the arbiter of cell arrivals to its jth high (low) priority VOQ and it is decremented when a grant is sent to the ith input for the jth high (low) priority VOQ.

A fluid VOQ length counter is maintained by the FFTA as follows. Let $f_{ij}^{hp}$ ($f_{ij}^{lp}$) be the length of the jth high (low) priority fluid VOQ in the ith input port. $f_{ij}^{hp}$ ($f_{ij}^{lp}$) is incremented whenever, the VOQC of the ith input port informs the arbiter of cell arrivals to its jth high (low) priority VOQ. The fluid counter is decremented (by fractions of cells) during the update_fluid_queue_lengths( ) step of the FFTA algorithm described in the next section.

Amount of Service of Input and Output Ports are maintained by the FFTA as follows. Let $s_i^{in}$ ($s_i^{out}$) be the amount of fluid cells transferred from (to) the ith input (output) port during the current arbitration cycle. These variables are reset to zero at the start of each arbitration cycle and is incremented every time fluid cells are transferred. Let $a_i^{in}$ ($a_i^{out}$) be the maximum amount of fluid cells that can be transferred from (to) the ith input (output) port during each arbitration cycle. These variables are proportional to the number of asynchronous channels allocated to the port, viz., (WEIGHT_RESOLUTION*number_of_async_channels_allocated_to_the_port/MAX_NUMBER_OF_ASYNC_CHANNELS where the MAX_NUMBER_OF_ASYNC_CHANNELS is 60.

A variable called block fluid length is maintained by the FFTA as follows. Specifically, each output port of the arbiter has a variable called the "block fluid length." This variable is incremented whenever an extraneous cell arrives to the port. Multicast cells, mate port cells of bridged VCs and cells that arrive when the output port buffer has exceeded its threshold are extraneous from the perspective of the arbiter, because these cells are not directly granted by the arbiter. To the arbiter, these cells appear as "background noise" and the arbiter works around them. That is, whenever, there is an extraneous cell, the arbiter impedes its rate of granting of low priority traffic as described below.

Service amount reduction is maintained by the FFTA as follows. $p_i^{out}$ is an experimental variable associated with the ith output port. This value is set to (WEIGHT_RESOLUTION*sum of the multicast and mate port bridged flow to the port)/OC48_RATE. This amount is subtracted from $a_i^{out}$. This approach is to be used instead of the block fluid approach described above. The disadvantage of this approach is that low priority traffic cannot use the bandwidth allocated to the multicast and bridged VC, even when the latter is idle.

The data structures of the fluid flow tracking arbiter consists of variables associated with the input ports, the output ports and the input-output port pairs. In the pseudo-code shown below, the variables associated with the input port are shown as members of the stuck ARB_INPUT_PORT. Similarly, those associated with the output port and the input-output port pair are shown as members of the struct ARB_OUTPUT_PORT and struct ARB_INOUT_PORT, respectively. For example, each input port contains a boolean variable to indicate whether or not the input port is enabled or disabled, an integer variable to indicate the winning output port for the input port and variables to represent $s_i^{it}$ and $a_i^{in}$.

First of all, define the global constants, number of ports and the weight resolution, which is 8-bits.
const int NUM_PORTS=24
const int WEIGHT_RESOLUTION=256;

The variables associated with the arbiter output ports are shown as members of the struct ARB_OUTPUT_PORT: These are the winning input port, $a_i^{out}$, $s_i^{out}$, $p_i^{out}$ and the block fluid length.

```
struct ARB_OUTPUT_PORT
{
    int winning_input;
    long a_o; //service_amount
    long s_o; //service
    long p_o; //service_amount_reduction
    long block_fluid_len;
};
```

The variables associated with the arbiter input port are shown as members of the struct ARB_INPUT_PORT: These are the Boolean variable to indicate whether or not the input port is enabled. The input port is disabled if the cell queue at the input of the asynchronous crosspoint switch exceeds its threshold or if the grant queue exceeds its threshold. The winning output port, $a_i^{in}$ and $s_i^{in}$.

```
struct ARB_INPUT_PORT
{
    bool enabled;
    int winning_output;
    long a_i;
    long s_i;
};
```

The variables associated with the arbiter input-output port pair are shown as members of the struct ARB_INOUT_PORT: These are $w_{ij}^{hp}$, $w_{ij}^{lp}$, the amount of (low priority) fluid cell requested by the output port to the input port, $f_{ij}^{hp}$, $p_{ij}^{hp}$, $f_{ij}^{lp}$, $p_{ij}^{lp}$.

```
struct ARB_INOUT_PORT
{
    long hp_weight;
    long lp_weight;
    long request;
    long hp_fluid_q_len;
    long hp_cell_q_len;
    long lp_fluid_q_len;
    long lp_cell_q_len;
};
```

The data structure of the arbiter consists of a one-dimentional array of ARB_INPUT_PORT and ARB_OUTPUT_PORT of length NUM_PORTS. It also contains a NUM_PORTS×NUM_PORTS two-dimensional array of ARB_INOUT_PORT.

An interface to the arbiter consists of member functions to set weights for the flows, inform the arbiter of cell arrivals to the VOQ, enable/disable input ports, enable/disable output ports, inform the arbiter of the asynchronous bandwidth of each port and functions to compute the winning output port for each input port. The arbiter also consists of several private member functions that are called by the public member functions. These functions will be described later when the public member functions are described.

```
class ARBITER
{
    private:
        ARB_INPUT_PORT input_port[ NUM_PORTS ];
        ARB_OUTPUT_PORT output_port[ NUM_PORTS ];
        ARB_INOUT_PORT inout_port[ NUM_PORTS ][ NUM_PORTS ];
        // private member functions
        void update_fluid_q_lens( void );
        void init_service( void );
        void transfer_hp_fluid( void );
        void add_block_fluid( void );
        void make_lp_requests( void );
        void serve_lp_requests( void );
        int find_output_port( int ipi, bool& hp_win,
            bool& mc_win ) const;
    public:
        inline void set_weight( int ipi,
            int opi,
            long weight,
            bool hp );
        void cell_arrival( int ipi, int opi, bool
hp, bool regular );
        void mc_cell_arrival( int ipi, ROUTING_MAP
```

-continued

```
rm );
        inline void enable_input( int ipi, bool
enable );
        inline void enable_output( int opi, bool
enable );
        inline void set_num_sts_channels_input( int
port,
            int num_ch );
        inline void set_num_sts_channels_output( int
port,
            int num_ch );
        inline void set_service_amount_reduction(
int port,
            long amount );
        void reset( void );
        // the return value of arbitrate( ) is an
array where
            // ith element represents the winning output
port of the
            // ith input port. If there are no winning
output port
            // then the value is -1. The second bool
array parameter
            // returns the priority of the grants.
            // true means high priority.
        void arbitrate( int* output_ports, bool*
priority );
};
```

Setting the weight of a flow (also called "input-output flow" may be performed via a public member function set_weight( ) which simply initializes the appropriate weight variable of the arbiter.

```
inline void ARBITER::set_weight( int ipi,
    int opi,
    long w,
    bool hp )
{
    ARB_INOUT_PORT& io = this->inout_port[ ipi ][ opi ];
    if( hp )
        io.hp_weight = w;
    else
        io.lp_weight = w;
}
```

Informing the FFTA of cell arrivals to the VOQ may be done as follows. There are two types of cell arrival. A regular arrival increments the request counter of the input-output pair whereas a non regular arrival, which informs the arbiter of an extraneous cell arrival (cell arrival to the mate port of a bridged VC) is used to increment the block fluid length of the output port.

```
// cell arrival: increment the voq length . . .
inline void ARBITER::cell_arrival( int ipi,
    int opi,
    bool hp,
    bool regular )
{
    // for silent requests, simply introduce fluid
cells in the
        // output port to block its service amount.
    if( regular == false )
    {
        ARB_OUTPUT_PORT& op = this->output_port[ opi
];
        op.block_fluid_len += WEIGHT_RESOLUTION;
```

```
        return;
    }
    // regular arrivals increment both the cell and
fluid queues.
    ARB_INOUT_PORT& io = this->inout_port[ ipi ][
opi ];
    if( hp )
    {
        io.hp_fluid_q_len += WEIGHT_RESOLUTION;
        ++( io.hp_cell_q_len );
    }
    else
    {
        io.lp_fluid_q_len += WEIGHT_RESOLUTION;
        ++( io.lp_cell_q_len );
    }
}
```

When a cell arrives to the multicast flows, the following function is used to introduce block fluid into all the output ports of the arriving multicast cell.

```
inline void ARBITER::mc_cell_arrival( int ipi,
ROUTING_MAP rm )
{
    for( int opi = 0; opi < NUM_PORTS; ++opi )
    {
        ARB_OUTPUT_PORT& op = this->output_port[ opi
];
        if( rm.is_set_port( opi ) )
        {
            assert( op.block_fluid_len >= 0 );
            op.block_fluid_len += WEIGHT_RESOLUTION;
        }
    }
}
```

The following member function is used to enable or disable the specified input port. If an input port is disabled, the arbiter does not generate grants for the input port.
Feedback from the Crosspoint Switch

```
inline void ARBITER::enable_input( int ipi, bool
enable )
{
    ARB_INPUT_PORT& ip = this->input_port[ ipi ];
    ip.enabled = enable;
}
```

The following member function is used to enable or disable the specified output port. Disabling the output port simply increments the block fluid length of the output port, which impedes the granting of low priority cells.

```
inline void ARBITER::enable_output( int opi, bool
enable )
{
    if( enable == false )
        op.block_fluid_len += WEIGHT_RESOLUTION;
}
```

Informing the Arbiter of Port Speed
The following member function is used to set the service limit, $a_i^{in}$, of the input port. As already mentioned, this is proportional to the number of asynchronous channels allocated to the input port.

```
inline void ARBITER::set_num_sts_channels_input( int
port,
    int num_ch )
{
    ARB_INPUT_PORT& ip = this->input_port[ port ];
    ip.a_i = ( WEIGHT_RESOLUTION * num_ch )
        / MAXIMUM_NUMBER_OF_ASYNC_CHANNELS;
}
```

The following member function is used to set the service limit, $a_i^{out}$, of the output port. As already mentioned, this is proportional to the number of asynchronous channels allocated to the output port.

```
inline void ARBITER: :set_num_sts_channels_output(
int port,
    int num_ch )
{
    ARB_OUTPUT_PORT& op = this->output_port[ port ];
    op.a_o = ( WEIGHT_RESOLUTION * num_ch )
        / MAXIMUM_NUMBER_OF_ASYNC_CHANNELS;
}
```

Resetting the Arbiter
The following function resets the arbiter. It initializes all the relevant variables of the arbiter.

```
void ARBITER: :reset( void )
{
    for( int i = 0; i < NUM_PORTS; ++i )
    {
        ARB_INPUT_PORT& ip = input_port[ i ];
        ARB_OUTPUT_PORT& op = output_port[ i ];
        ip.enabled = true;
        ip.winning_output = -1;
        op.winning_input = -1;
        op.block_fluid_len = 0;
        for( int j = 0; j < NUM_PORTS; ++j )
        {
            ARB_INOUT_PORT& io = inout_port [ i ][ j
];
            io.hp_fluid_q_len = 0;
            io.hp_cell_q_len = 0;
            io.lp_fluid_q_len = 0;
            io.lp_cell_q_len = 0;
            io.request = 0;
        }
    }
}
```

The following function is used to compute the grants. The caller supplies a pointer to an array of output ports and a pointer to an array of booleans. The function computes the winning output port for each of the input ports and whether or not the winner is high priority. This function is called every INTER_ARBITRATION_INTERVAL (e.g. every 12 cycles or 10 cycles depending on the implementation) and the result is used to send grants to the VOQC. The function works as follows: First the private member function update_fluid q_lens( ) is used to transfer appropriate amount of fluid cells from the input ports to the output ports. Then the private member function, find_output_port( ) is used to find the winning output port for each input port. If there are no winning output ports for an input port, this is indicated by −1. If there are winning output port for an input port, then the number of request is decremented by one.

Running the arbiter is as follows.

```
void ARBITER::arbitrate( int* winning_out_port_of_input_port,
   bool* high_priority )
{
update_fluid_q_lens( );
for( int ipi = 0; ipi < NUM_PORTS; ++ipi )
   {
   ARB_INPUT_PORT& ip = this->input_port[ ipi ];
   if( ip.enabled == false )
      {
      winning_out_port_of_input_port[ ipi ] = -1;
      high_priority[ ipi ] = false;
      continue;
      }
   bool hp_win;
   int opi = find_output_port( ipi, hp_win );
   winning_out_port_of_input_port[ ipi ] = opi;
   high_priority[ ipi ] = hp_win;
   // if a grant was sent, decrement the appropriate
   // request counter.
   if( opi != -1 )
      {
      ARB_INOUT_PORT& io = this->inout_port[ ipi ][ opi ];
      if( hp_win )
         --( io.hp_cell_q_len );
      else
         --( io.lp_cell_q_len );
      }
   }
}
```

The private member function update_fluid_q_lens( ) is shown below. It calls a series of other private functions. First the init_service( ) function is called to initialize, $s_i^{in}$ and $s_i^{out}$ to 0 for all the input and output ports. Then, the function transfer_hp_fluid( ) is called to transfer high priority fluid from the input ports to the output ports. The add_block_fluid( ) function is used to fill the remaining $a_i^{out}$ with block fluid. Finally the functions make_lp_request( ) and serve_lp_request( ) are called a number of iterations to fill any remaining part of $a_i^{out}$ with low priority fluid.

Transferring fluid from input units to the output units is done as follows.

```
void ARBITER: :update_fluid_q_lens( void )
   {
   init_service( );
   transfer_hp_fluid( );
   add_block_fluid( );
   for( int itr = 0; itr < number_of_iterations;
++itr )
      {
      make_lp_requests( );
      serve_lp_requests( );
      }
   }
```

The init_service( ) function is called to initialize, $s_i^{in}$ and $s_i^{out}$ to 0.

```
void ARBITER: :init_service( void )
   {
   for( int i = 0; i < NUM_PORTS; ++i )
      {
      ARB_INPUT_PORT& ip = this->input_port[ i ];
      ARB_OUTPUT_PORT& op = this->output_port[ i
];
      ip.s_i = 0;
```

```
      op.s_o = 0;
      }
   }
```

Transferring High Priority Fluid

The transfer_hp_fluid( ) function simply transfers an amount delta from the ith input port to the jth output port and updates the variables, $s_i^{in}$, $s_i^{out}$ and $f_{ij}^{hp}$. Delta is simply equals to $w_{ij}^{hp}$. However, since delta cannot exceed $f_{ij}^{hp}$, $(a_i^{out} - p_i^{out} - s_i^{out})$, $(a_i^{in} - s_i^{in})$, delta is equal to the minimum of these four quantities.

```
void ARBITER: :transfer_hp_fluid( void )
   {
   for( int ipi = 0; ipi < NUM_PORTS; ++ipi )
      {
      ARB_INPUT_PORT& ip = this->input_port[ ipi
];
      if( ip.enabled )
         {
         for( int opi = 0; opi < NUM_PORTS; ++opi
)
            {
            ARB_OUTPUT_PORT& OP = this-
>output_port[ opi ];
            ARB_INOUT_PORT& io = this-
>inout_port[ ipi ][ opi ];
            long delta = io.hp_weight <?
io.hp_fluid_q_len;
            delta = delta <? ( ip.a_i - ip.s_i
);
            delta = delta <? ( ( op.a_o - op.p_o
) - op.s_o ) ;
            ip.s_i += delta;
            op.s_o += delta;
            io.hp_fluid_q_len -= delta;
            }
         }
      }
   }
```

The add_block_fluid( ) function transfers block fluid to the remaining $a_i^{out}$. That is, the output service limit is first filled with high priority fluid, then by block fluid and as will be shown any remaining part is filled with low priority fluid. Therefore, if there are sufficient amount of block fluid in the output port, then there will not be any room for the low priority fluid. This means that the low priority fluid is drained from the input port at slower rate and hence the rate at which the grants are issued to the low priority VOQ is less. As, already indicated, the feedback mechanism from the output port of the asynchronous switch is used to increment the block fluid of the arbiter output port.

```
void ARBITER: :add_block_fluid( void )
   {
   for( int opi = 0; opi < NUM_PORTS; ++opi )
      {
      ARB_OUTPUT_PORT& op = this->output_port[ opi
];
      long delta = ( ( op.a_o - op.p_o ) - op.s_o
) <? op.block_fluid_len;
         op.s_o += delta;
         op.block_fluid_len -= delta;
      }
   }
```

Once the block fluid is introduced into the service quota of the arbiter output port, any remaining space is filled with low priority fluid. Consider the ith output port. Its remaining space ($a_i^{out}-p_i^{out}-s_i^{out}$) is divided among the eligible input ports proportional to their low priority weights. An input port is eligible, if it is enabled, has fluid cells destined to the ith output port and its service quota is not used up: $a_j^{in}>s_j^{in}$. The outer loop of the member function make_lp_request( ) iterates through each of the output port The first inner loop of the function computes the sum of the low priority weights over all eligible input port: the sum of the weights for the ith output port is $$\sum_{j\in E_i} w_{ji}^{lp},$$

where $E_i$ is the set of eligible input ports for the ith output port. The second inner loop computes the amount of fluid cell to request each input port. The amount of fluid requested by the ith output port to the jth input port, $r_{ij}$, is $$(a_i^{out} - p_i^{out} - s_i^{out})*w_{ji}^{lp} / \sum_{j\in E_i} w_{ji}^{lp}.$$

Of course, if the jth input port is disabled, or if it does not have any low priority fluid or if the input ports service quota is used then the requested amount is 0.

```
void ARBITER: :make_lp_requests( void )
{
    // for each output port . . .
    for( int opi = 0; opi < NUM_PORTS; ++opi )
    {
        ARB_OUTPUT_PORT& op = this->output_port[ opi ];
        // compute the sum of the weights from all the
        // enabled input ports with fluid cells destined
        // to the output port . . .
        long sum_w = 0;
        for( int ipi = 0; ipi < NUM_PORTS; ++ipi )
        {
            ARB_INPUT_PORT& ip = this->input_port[ ipi ];
            ARB_INOUT_PORT& io = this->inout_port[ ipi ][ opi ];
            bool cond = ( ip.enabled ) &&
                ( io.lp_fluid_q_len > 0 ) &&
                ( ip.s_i < ip.a_i );
            if( cond )
            {
                sum_w += io.lp_weight;
            }
        }
        // compute the request to the enabled inputs
        // from enabled outputs...
        long f = ( ( op.a_o - op.p_o ) - op.s_o );
        for( int ipi = 0; ipi < NUM_PORTS; ++ipi )
        {
            ARB_INOUT_PORT& io = this->inout_port[ ipi ][ opi ];
            ARB_INPUT_PORT& ip = this->input_port[ ipi ];
            bool cond = ( sum_w > 0 ) &&
                ( ip.enabled ) &&
                ( io.lp_fluid_q_len > 0 ) &&
                ( ip.s_i < ip.a_i );
            if( cond )
                io.request = ( f * io.lp_weight ) / sum_w;
            else
                io.request = 0;
        }
    }
}
```

The serve_lp_request( ) member function iterates through each of the arbiter input ports and computes the amount of fluid to be served to the requesting output ports. As in the make_lp_request( ) function, the first inner loop computes the sum of the low priority weights over all output ports with non-zero request to this input port. The second inner computes the amount of low priority fluid to be served to the output ports. The outer loop in the serve_lp_request( ) can be repeated to fill any remaining requests.

```
void ARBITER: :serve_lp_requests( void )
{
    // for each input port . . .
    for( int ipi = 0; ipi < NUM_PORTS; ++ipi )
    {
        if( ip.enabled == false )
            continue;
        ARB_INPUT_PORT& ip = this->input_port[ ipi ];
        // compute the sum of the weights to the enabled outputs
        // which had made non-zero requests . . .
        long sum_w = 0;
        for( int opi = 0; opi < NUM_PORTS; ++opi )
        {
            ARB_INOUT_PORT& io = this->inout_port[ ipi ][ opi ];
            if( io.request > 0 )
                sum_w += io.lp_weight;
        }
        // compute the service amount . . .
        long f = ( ip.a_i - ip.s_i );
        for( int opi = 0; opi < NUM_PORTS; ++opi )
        {
            ARB_OUTPUT_PORT& op = this->output_port[ opi ];
            ARB_INOUT_PORT& io = this->inout_port[ ipi ][ opi ];
            long bound = io.lp_fluid_q_len <? io.request;
            long delta;
            if( sum_w > 0 )
                delta = ( ( f * io.lp_weight ) / sum_w ) <? bound;
            else
                delta = 0;
            ip.s_i += delta;
            op.s_o += delta;
            io.lp_fluid_q_len -= delta;
        }
    }
}
```

The function find_output_port( ) computes the winning output port and priority for each input port. The winning output port is the port with the largest difference between the cell queue and the fluid queue. The variable max_diff keeps track of the maximum difference. Note that, an output port is only considered if the difference between the cell queue and fluid queue is greater than some positive threshold. The value of the threshold is proportional to the index of the input port. The reason for this staggered enabling is to minimize burst of grants for an input port.

```
int ARBITER::find_output_port( int ipi,
    bool& hp_win ) const
{
  int winning_opi = -1;
  bool hp_win = false;
  long max_diff = 0;
  long threshold = ( WEIGHT_RESOLUTION * ipi ) / NUM_PORTS;
  // find the output port with the maximum difference between
  // the fluid and packet queues . . .
  for( int opi = 0; opi < NUM_PORTS; ++opi )
    {
      const ARB_INOUT_PORT& io = this->inout_port[ ipi ][ opi ];
      long diff_hp = ( io.hp_cell_q_len * WEIGHT_RESOLUTION )
          - io.hp_fluid_q_len;
      long diff_lp = ( io.lp_cell_q_len * WEIGHT_RESOLUTION )
          - io.lp_fluid_q_len;
      if( ( diff_hp >= threshold ) &&
          ( diff_hp > max_diff ) )
        {
          max_diff = diff_hp;
          winning_opi = opi;
          hp_win = true;
        }
      if( ( diff_lp >= threshold ) &&
          ( diff_lp > max_diff ) )
        {
          max_diff = diff_lp;
          winning_opi = opi;
          hp_win = false;
        }
    }
  return( winning_opi );
}
```

Floating point quantities may be avoided in the FFTA as follows. In the algorithm described above, ideally, floating point variables be used for the weights and fluid counters. However, the resulting hardware cost can be avoided by using integer quantities with sufficient resolution. A suitable resolution is 256 or 8-bits. Thus, the smallest high priority bandwidth that can be allocated is $1/256$ of the OC48 rate=10 Mbits/sec.

The hardware structure of FFTA is shown in FIG. 4. It consists of a complete interconnection of 24 input units to 24 output units. The interfaces of the input and output units are shown in FIG. 3. The low priority fluid transfer iterations are done as follows: The ith input unit asserts the ready signal, whenever it is enabled, it has fluid cells destined to the output port and its service amount, $s_i^{in} < a_i^{in}$. The jth output unit computes the request amount and requests the input units that are ready. The inputs compute the served amount and inform the output units that made non-zero request. As stated before, the amount served does not exceed, the amount requested nor does it exceed the amount of current fluid backlog. An input unit with disable asserted will not assert the ready signal. Similarly, an output unit with disable asserted will not request any service. The disable signals are asserted by the asynchronous crosspoint switch in a fashion similar to the current arbiter. The phase input to the input and output units inform, which phase of the algorithm is the current phase.

To compute the request amount, in one clock cycle, each output unit needs 24 8-bit multipliers and a single divider. Similarly, the input unit also requires 24 8-bit multipliers and a single divider. (These multipliers can possibly be shared, since they do not compute simultaneously.)

The multiplier unit computes the 8-bit quantity, r (request) from the three 8-bit quantities f (free amount), w (weight), and s (sum of weights). These quantities satisfy the following constraints.

1. $0 \leq w \leq s$
2. $s > 0$
3. $0 \leq r \leq 2^8$

If the inputs violate one or more of the above constraints, then the outputs can be set to "don't care" values. These don't care values can be used to minimize logic of the multiplier/divider unit (using Quine-McClusky algorithm). Each input and output unit of the arbiter needs 24 such multiplier/divider units (assuming no sharing).

To support bridging and multicasting, each input port needs some additional logic to keep track of the output ports to which, a copy of the cells has been sent. The input port needs to be able to hold the routing map and clear the bits as copies of the head of the line cell is sent to their output ports. As before, the round robin scheduler of each output port operates independently. If more than one output selects an input port, then the input port selects a subset of the output ports to which the head-of-the-line (HOL) cell is destined and sends copies of the HOL cell simultaneously to the subset of the output ports.

Addendum C

In one specific implementation, an arbiter of the type described herein has 24 input units and 24 output units, and keeps track of the length of each of the 24×24=576 VOQs using 576 counters for each priority. Since the arbiter supports two priorities (also called QoS classes), the arbiter uses 1152 registers to keep track of the VOQ lengths. By use of weights, the arbiter provides linear bandwidth controllability. For high-priority flows, the bandwidth received by the flow must never be less than the specified bandwidth. The high-priority flows are never overbooked. For the low priority flows, the bandwidth received by a flow is proportional to the specified bandwidth (in the form of weights). At least two unicast QoS classes may be supported in such an implementation. Including the multicast/bridging, the following classes are supported: a) Multicast/Bridge with Guaranteed Bandwidth and Delay b) Unicast Guaranteed Bandwidth and Delay and c) Unicast Weighted Best Effort. Furthermore, at least 2-way bridging (multicast) of not necessarily adjacent ports is provided for redundancy support. Specifically 2-way bridging is required for supporting unidirectional path switched ring (UPSR). The arbiter is scalable to higher speeds: one embodiment has a switch capacity of 50 Gbits/sec and another embodiment's capacity is 200 Gbits/sec. The arbiter has low hardware complexity and low power requirements because it is implementable in: a) 0.13 micron ASIC process or smaller, with b) maximum core clock frequency<=155 Mhz, and c) die area $\leq 14$ mm_sq.

This implementation of the arbiter is used with a passive backplane across which the line cards (input and output ports) and switching fabric cards (arbiter and cross-connect) are mounted. The backplane does not contain any active components so as to reduce the probability of it being a single point of failure. The line cards contain the ingress and egress network processors which perform such tasks as policing, per-virtual connection (VC) queuing, per-VC accounting, scheduling and shaping. In the case of virtual output queued switches, the line cards also contain the input buffers that implement virtual output queues (voqs), and controllers for the voqs that communicate with the arbiter to indicate arrival of traffic and receive grants for transfer of the traffic.

Specifically, the arbiter and the crosspoint switch are placed in the switching fabric card. The physical separation of the arbiter and the voqs has important implication for the switch design. The communication via the backplane is expensive because these signals have to be driven by high current transceivers to reduce signal degradation. Hence, the links between the line units and the switching fabric are only a few serial links and suffer some delay. If the arbiter grants are used to control the crosspoint switch directly, then the delay can reduce throughput of the switch.

Figure 1A:
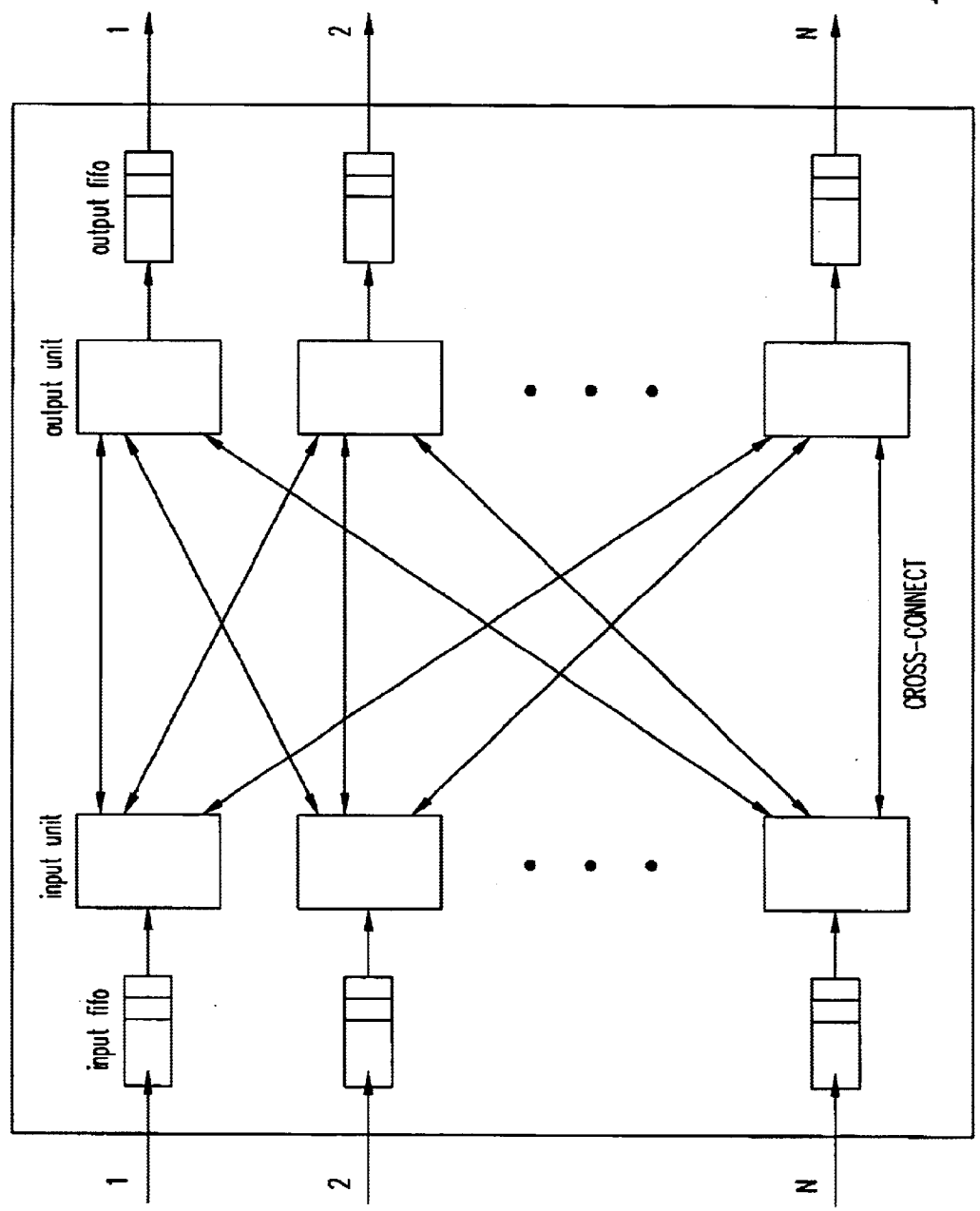
FIG. 1A illustrates a crosspoint switch of the prior art.
Figure 1B:
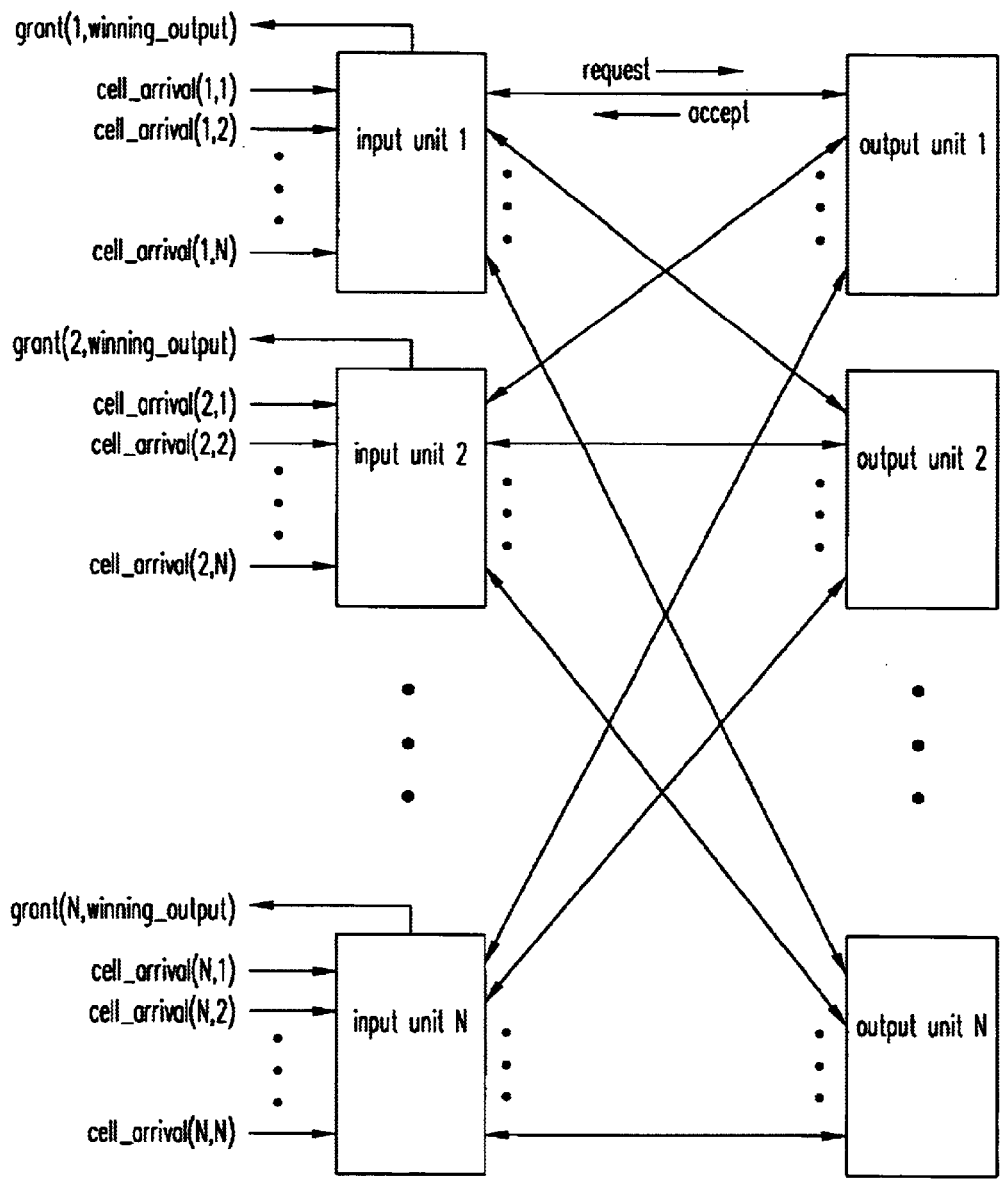
FIG. 1B illustrates, in a block diagram, an iSLIP arbiter of the prior art implemented by a number of input units and output units that are each connected to the other by two unidirectional serial lines.

A solution to this problem is to enhance a cross-connect of the type shown in FIG. 1A with one or more round-robin schedulers. As shown in FIG. 1A, small FIFOs are located at the input and output ports of the crosspoint switch. In the enhanced version of the cross-connect, the set of signals exchanged between an input unit and an output unit include the following three signals. A cell available signal from the input unit informs the output unit that the HOL cell in its FIFO is destined to the output unit. A select signal from the output unit informs the input unit that the output unit has selected the input unit. A multi-bit cell bus in the cross-connect, from the input unit to the output unit transfers the cell.

Each output unit of such an enhanced cross-connect also has a simple independent scheduler which serves the input units that have asserted the cell available signal in a round-robin fashion. An arbiter of the type described above does not directly control such an enhanced cross-connect. The arbiter simply receives indications of cell arrivals from voqs in the line unit and issues grants to them. Therefore, the arbiter is "loosely coupled" to the enhanced cross-connect. The arbiter only receives signals from the enhanced cross-connect indicating the fill levels of the FIFOs. If the FIFO levels exceed some set threshold, the arbiter slows down issuing grants to the congested ports. The loose coupling of an arbiter of the type described herein with a cross-connect that is enhanced with round-robin schedulers works well in practice. As noted elsewhere herein, instead of a cross-connect, any other switch may be used with such an arbiter and such other switch may be enhanced as described above.

What is claimed is:

1. A method of transferring traffic through a switch comprising a plurality of input ports and a plurality of output ports, the method comprising:

incrementing a pair of counters for a flow of traffic from an input port destined to an output port, in response to receipt of traffic at the input port;

decrementing a counter (hereinafter "first counter") in the pair of counters for each flow if the first counter is nonzero;

selecting one of the flows at the input port (hereinafter "winning flow") based at least partially on values of counters in the pair for each flow from the input port to one of the output ports; and generating a signal to transfer traffic in the winning flow at the input port.

2. The method of claim 1 wherein:

the decrementing of the first counter is based at least partially on a predetermined bandwidth requirement (hereinafter "weight") of the flow.

3. The method of claim 1 further comprising:

decrementing the second counter corresponding to the winning output port of the input port;

periodically repeating said act of decrementing first counter unless the first counter is zero;

if a predetermined criterion is satisfied by counters in a pair for at least one flow from the input port during a period, then repeating said act of selecting, repeating said act of generating unless the second counter is zero, and repeating said act of decrementing the second counter.

4. The method of claim 3 wherein:

the predetermined criterion for the pair of counters comprises the first counter being less than or equal to the second counter.

5. The method of claim 3 wherein:

the predetermined criterion for the pair of counters comprises the first counter being less than the second counter by an amount based on an identity of the input port.

6. The method of claim 1 wherein:

said flow is one of a plurality of flows between said input port and said output port;

each flow is associated with at least two counters; and said acts of (incrementing, decrementing first counter, selecting and generating) are performed at least once for each flow.

7. The method of claim 6 wherein:

said output port is one of a plurality of output ports coupled to said input port; and the winning output port of the input port is selected only if a difference between counters for one of the flows to the winning output port is the maximum among differences between counters for all flows of all output ports.

8. The method of claim 6 wherein:

said output port is one of a plurality of output ports coupled to said input port; and the winning output port of the input port is selected only if a difference between counters for one of the flows to the winning output port is the maximum among differences between counters for flows of all output ports that satisfy a predetermined criterion.

9. The method of claim 6 wherein:

the plurality of flows comprises at least a high priority flow and a low priority flow; and the method further comprising maintaining a counter (hereinafter "used input port bandwidth") for the input port indicative of total decrements in a period in the first counter of each flow between the input port and all output ports including said output port; and the method further comprising using a difference (hereinafter "leftover input port bandwidth") between the used input port bandwidth and a predetermined input port bandwidth for transferring traffic in the low priority flows from the input port.

10. The method of claim 9 wherein the plurality of flows consists of only the high priority flow and the low priority flow, and the method further comprises:

generating a signal (hereinafter "readiness signal") indicative of readiness to transfer traffic from the input port to the output port if the first counter of the low priority flow is non-zero and if the leftover input port bandwidth is non-zero.

11. The method of claim 10 further comprising:

maintaining a counter (hereinafter "used output port bandwidth") for each output port indicative of a sum of decrements in the first counter of each flow between said output port and all input ports including said input port; and using a difference (hereinafter "leftover output port bandwidth") between the used output port bandwidth and a predetermined output port bandwidth for transferring traffic in the low priority flows to the output port.

12. The method of claim 11 further comprising:

indicating an amount (hereinafter "requested amount") of traffic from a low priority flow destined to the output port from each input port, based at least partially on the leftover output port bandwidth.

13. The method of claim 12 wherein:

the requested amount from an output port to the input port is obtained by proportional allocation of the leftover output port bandwidth among the low priority flows, based on the weights of the low priority flows.

14. The method of claim 13 further comprising:

indicating an amount (hereinafter "served amount") of traffic from a low priority flow from the input port destined to the output port, based at least partially on (a) the leftover input port bandwidth, (b) the requested amount, and (c) the weight of the low priority flow from the input port.

15. The method of claim 14 further comprising:

repeating the acts of (a) generating the readiness signal, (b) indicating the requested amount; and (c) indicating the served amount.

16. The method of claim 1 wherein:

the first counter has a higher resolution than the second counter.

17. An apparatus comprising:

a communication switch comprising a buffer for holding traffic at an input port destined to an output port; and a computer readable storage medium coupled to the communication switch, wherein the computer readable storage medium comprises a pair of counters for the buffer; and a state machine to automatically increment the pair of counters in response to receipt of traffic at the input port, wherein the state machine decrements a counter (hereinafter "first counter") in said pair, based at least partially on a predetermined bandwidth between the input port and the output port.

18. A method of transferring traffic through a switch comprising a plurality of input ports and an output port, the method comprising:

incrementing a pair of counters for a flow of traffic from an input port destined to an output port, in response to receipt of traffic at the input port;

decrementing a counter (hereinafter "first counter") in the pair of counters for each flow if the first counter is nonzero;

selecting an input port (hereinafter "winning input port") based at least partially on values of counters in the pair for at least one flow from the input port; and generating a signal to transfer an amount of traffic from the winning input port, to the output port.

* * * * *